(12) United States Patent  (10) Patent No.: US 9,251,103 B2
Mehta  (45) Date of Patent: Feb. 2, 2016

(54) MEMORY-ACCESS-RESOURCE MANAGEMENT

(75) Inventor: Bhavesh Mehta, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 349 days.

(21) Appl. No.: 13/570,132

(22) Filed: Aug. 8, 2012

(65) Prior Publication Data

US 2014/0047201 A1  Feb. 13, 2014

(51) Int. Cl.
*G06F 12/08* (2006.01)
*G06F 13/00* (2006.01)

(52) U.S. Cl.
CPC ......................... *G06F 13/00* (2013.01)

(58) Field of Classification Search
CPC .................... G06F 12/46; G06F 1/06
USPC .................... 711/158, 103, 154, 153
See application file for complete search history.

(56) References Cited

U.S. PATENT DOCUMENTS

2002/0143843 A1* 10/2002 Mehta ................. G06F 9/4881 718/102
2003/0217244 A1* 11/2003 Kelly ................. G06F 13/1684 711/168
2004/0054857 A1* 3/2004 Nowshadi ............ G06F 9/5011 711/153
2005/0235131 A1* 10/2005 Ware ................. G06F 12/0292 711/203
2011/0276974 A1* 11/2011 Chung et al. .................. 718/103
2012/0311277 A1* 12/2012 Chu et al. ...................... 711/158
2013/0007386 A1* 1/2013 Wolf et al. .................... 711/158

OTHER PUBLICATIONS

VMware, Resource Managment Guide, ESX Server 3.5, ESX Server 3i version 3.5, Virtual Center 2.5, 2009.*
Goyal, Pawan et al., "Start-Time Fair Queueing: A Scheduling Algorithm for Integrated Services Packet Switching Networks", IEEE/ACM Transactions on Networking, vol. 5, No. 5, Oct. 1997, pp. 690-704.

* cited by examiner

*Primary Examiner* — Brian Peugh
*Assistant Examiner* — Edmund Kwong

(57) ABSTRACT

The present application is directed to a memory-access-multiplexing memory controller that can multiplex memory accesses from multiple hardware threads, cores, and processors according to externally specified policies or parameters, including policies or parameters set by management layers within a virtualized computer system. A memory-access-multiplexing memory controller provides, at the physical-hardware level, a basis for ensuring rational and policy-driven sharing of the memory-access resource among multiple hardware threads, cores, and/or processors.

14 Claims, 31 Drawing Sheets

MEMORY-ACCESS-RESOURCE MANAGEMENT

TECHNICAL FIELD

The present patent application is directed to multi-core processor architecture and virtual-machine-based computing and, in particular, to hardware-level memory-access control that is exposed to, and managed by, external entities, including management layers within virtualized computing systems.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways, a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces. Despite the many layers of abstraction present in virtualized computing systems, physical hardware operation may nonetheless impact and constrain operations at higher levels of abstraction. Slow memory access due to conflicts between processors in multi-processor systems, for example, may degrade performance and constrain operations of virtual machines in virtualized computer systems. Researchers and developers of computer hardware and virtualization technologies continue to develop methods, systems, and technologies that ameliorate physical-hardware constraints and conflicts that propagate upward, through virtualization layers, to degrade performance of virtual machines.

SUMMARY

The present application is directed to a memory-access-multiplexing memory controller that can multiplex memory accesses from multiple hardware threads, cores, and processors according to externally specified policies or parameters, including policies or parameters set by management layers within a virtualized computer system. A memory-access-multiplexing memory controller provides, at the physical-hardware level, a basis for ensuring rational and policy-driven sharing of the memory-access resource among multiple hardware threads, cores, and/or processors.

DETAILED DESCRIPTION

Figure 1:
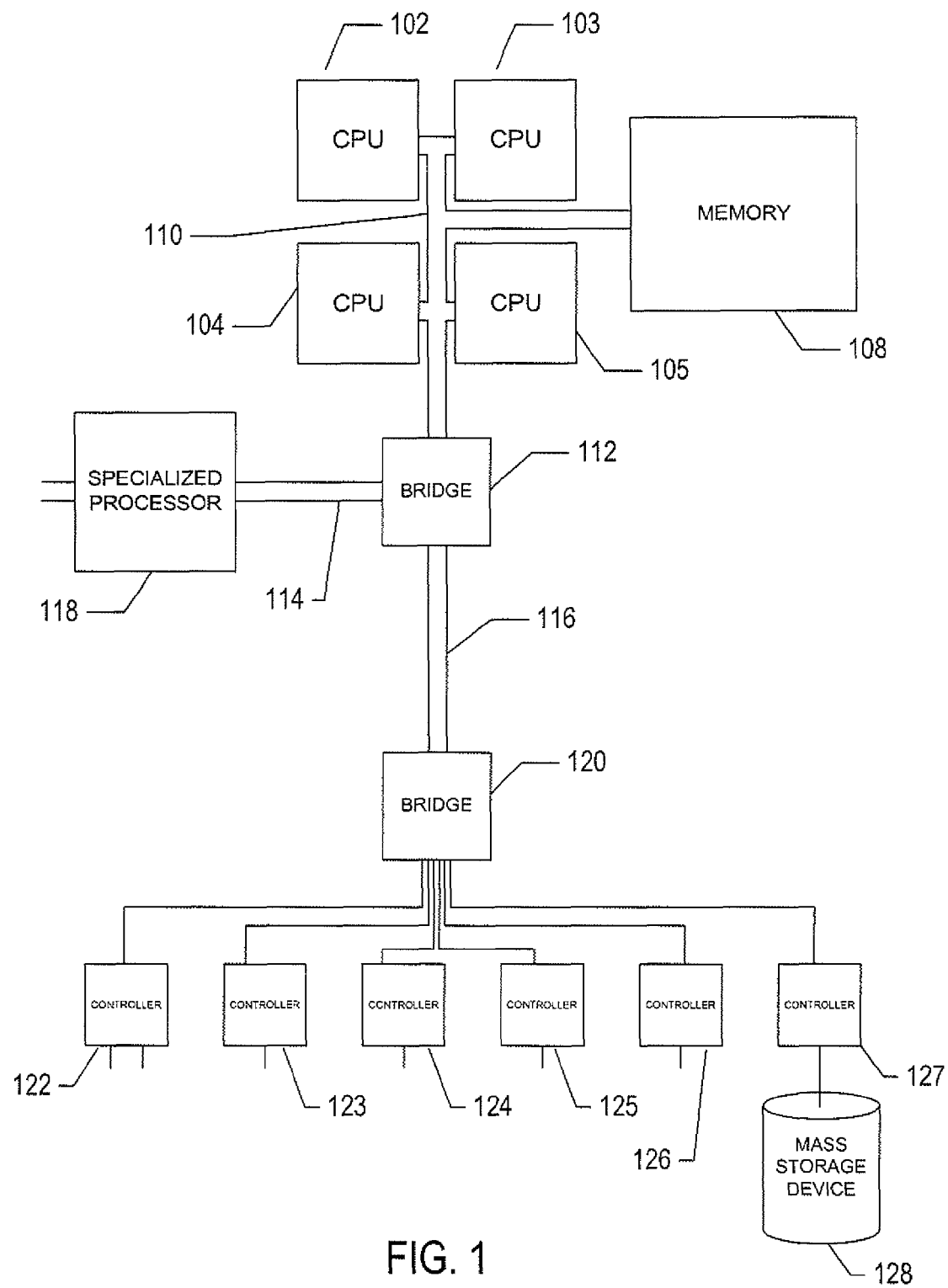
FIG. 1 provides a general architectural diagram for various types of computers.

The detailed discussion includes two subsections: (1) "An Overview of Virtualized Computer Systems and Multi-Core Processors;" and (2) "Memory-Access Resource Management Systems and Methods." The initial overview section discusses virtual machines, virtual data centers, processor architecture, hardware threads, and multi-core processors, reading of which can be omitted by those familiar with these subjects.

An Overview of Virtualized Computer Systems and Multi-Core Processors

As discussed above, modern computing can be considered to be a collection of many different levels of abstraction above the computing-hardware level that includes physical computer systems, data-storage systems and devices, and communications networks. The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction" when used to describe certain aspects of modern computing. For example, one frequently encounters allegations that because a computational system is described in terms of abstractions, functional layers, and interfaces, that it is somehow different from a physical machine or device. Such allegations are unfounded. One only needs to disconnect a computer system or group of computer systems from their respective power supplies to appreciate the physical, machine nature of complex computer technologies. One also frequently encounters statements made by those unfamiliar with modern technology and science that characterize a computational technology as being "only software," and thus not a machine or device. Software is essentially a sequence of encoded symbols, such as a printout of a computer program or digitally encoded computer instructions sequentially stored in a file on an optical disk, within an electromechanical mass-storage device, in an electronic memory, or in a solid-state disk. Software alone can do nothing. It is only when encoded computer instructions are loaded into an electronic memory within a computer system and executed on a physical processor that so-called "software implemented" functionality is provided. The digitally encoded computer instructions are an essential control component of processor-controlled machines and devices, no less essential than a cam-shaft control system in an internal-combustion engine.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
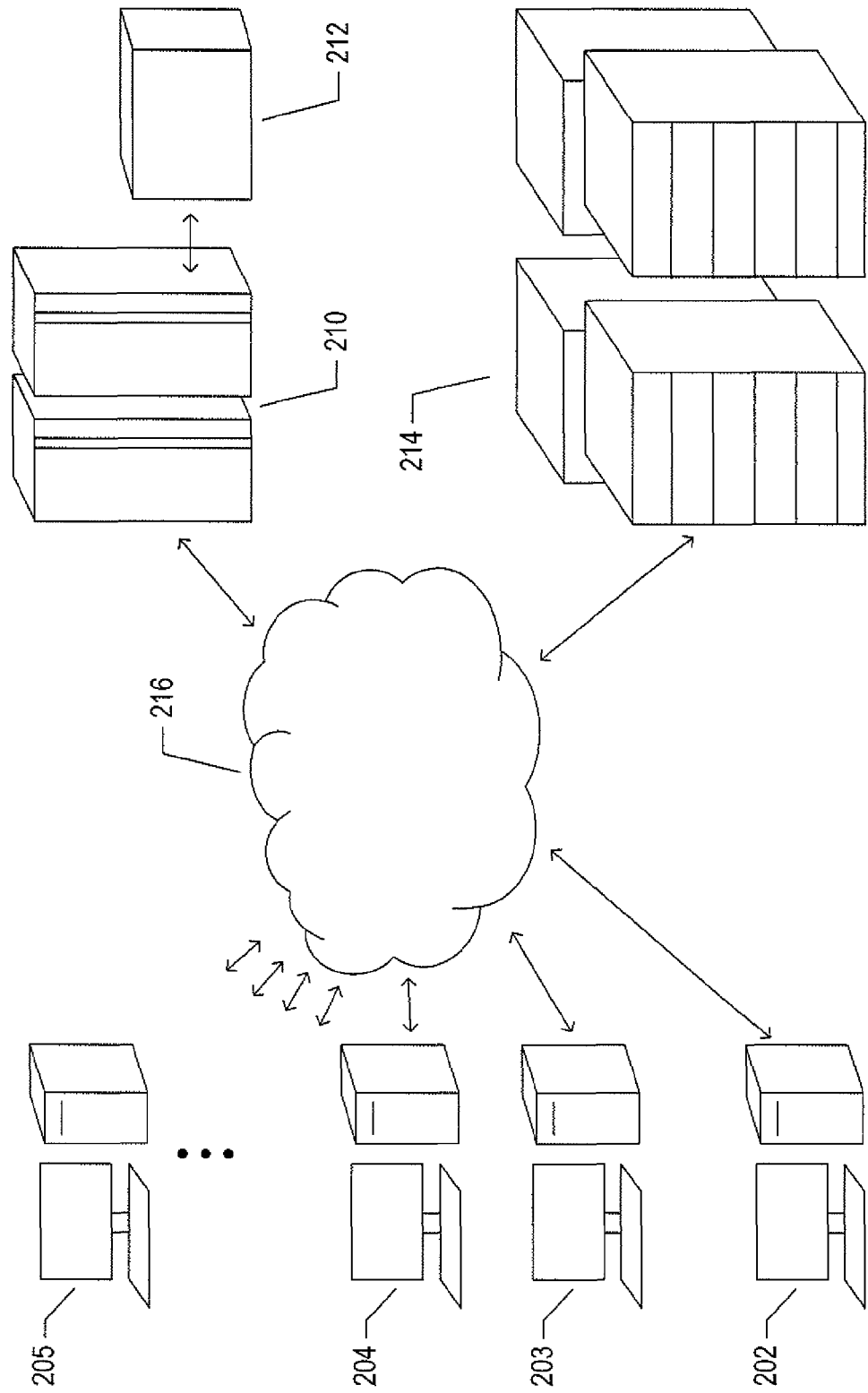
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
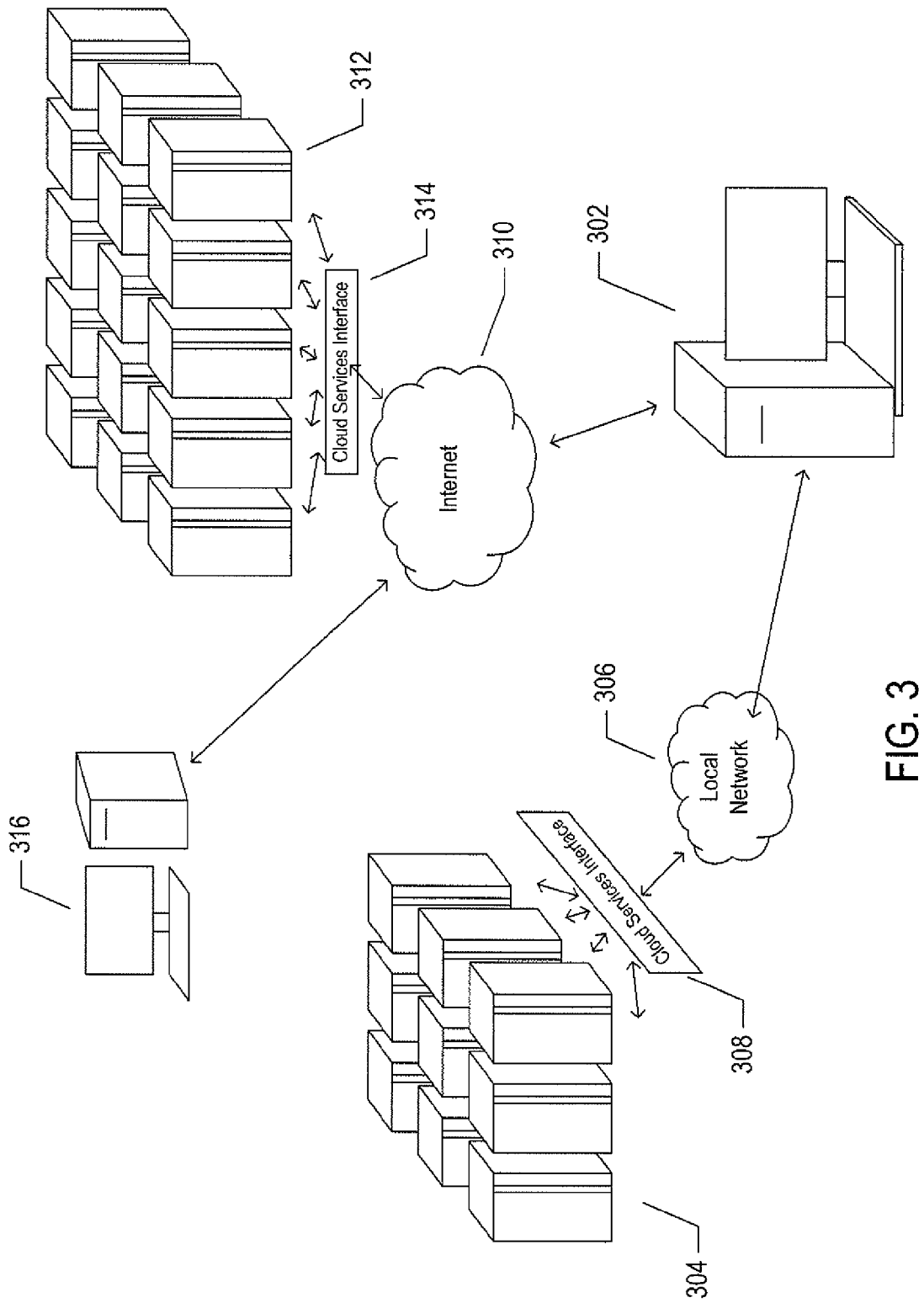
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
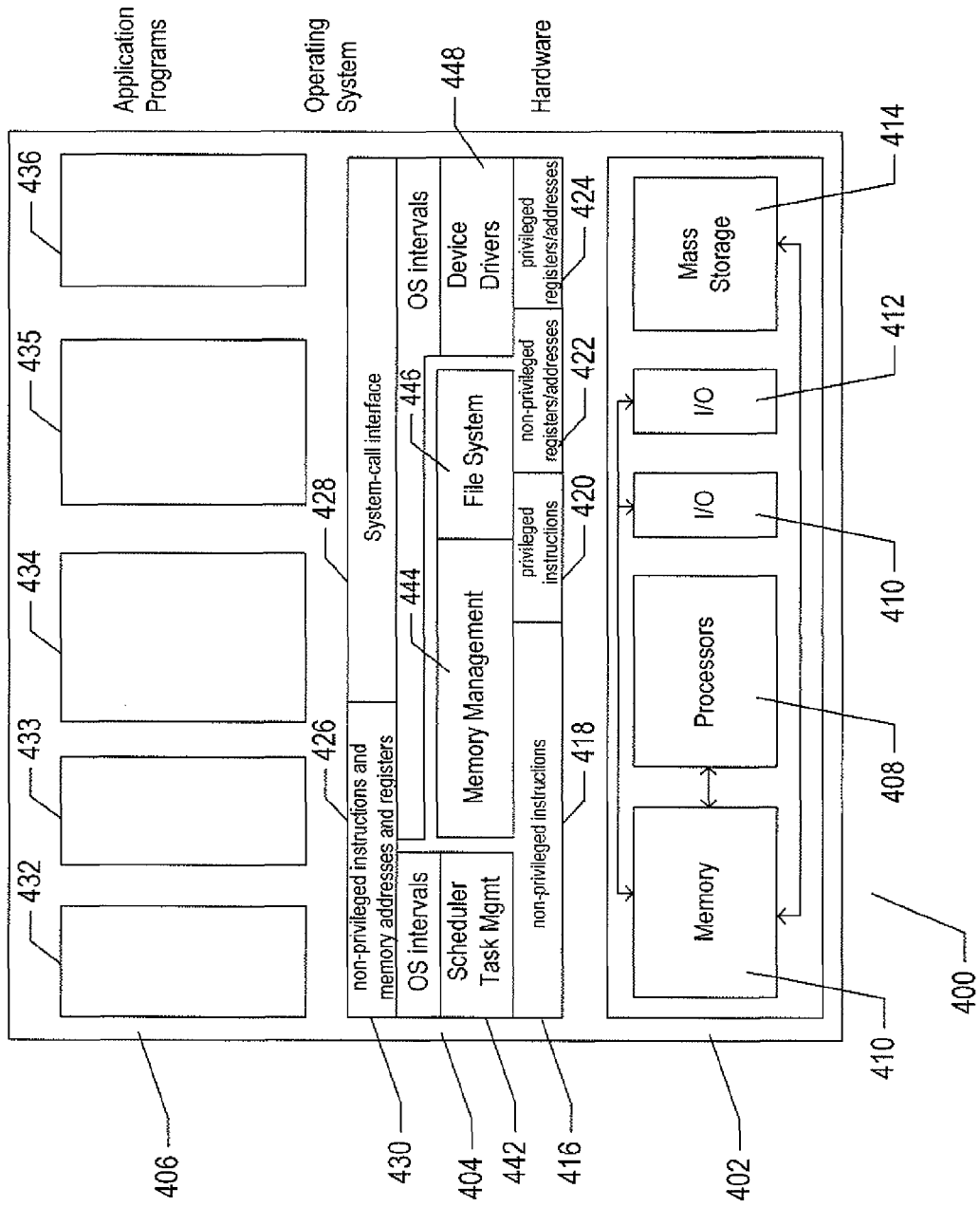
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5:
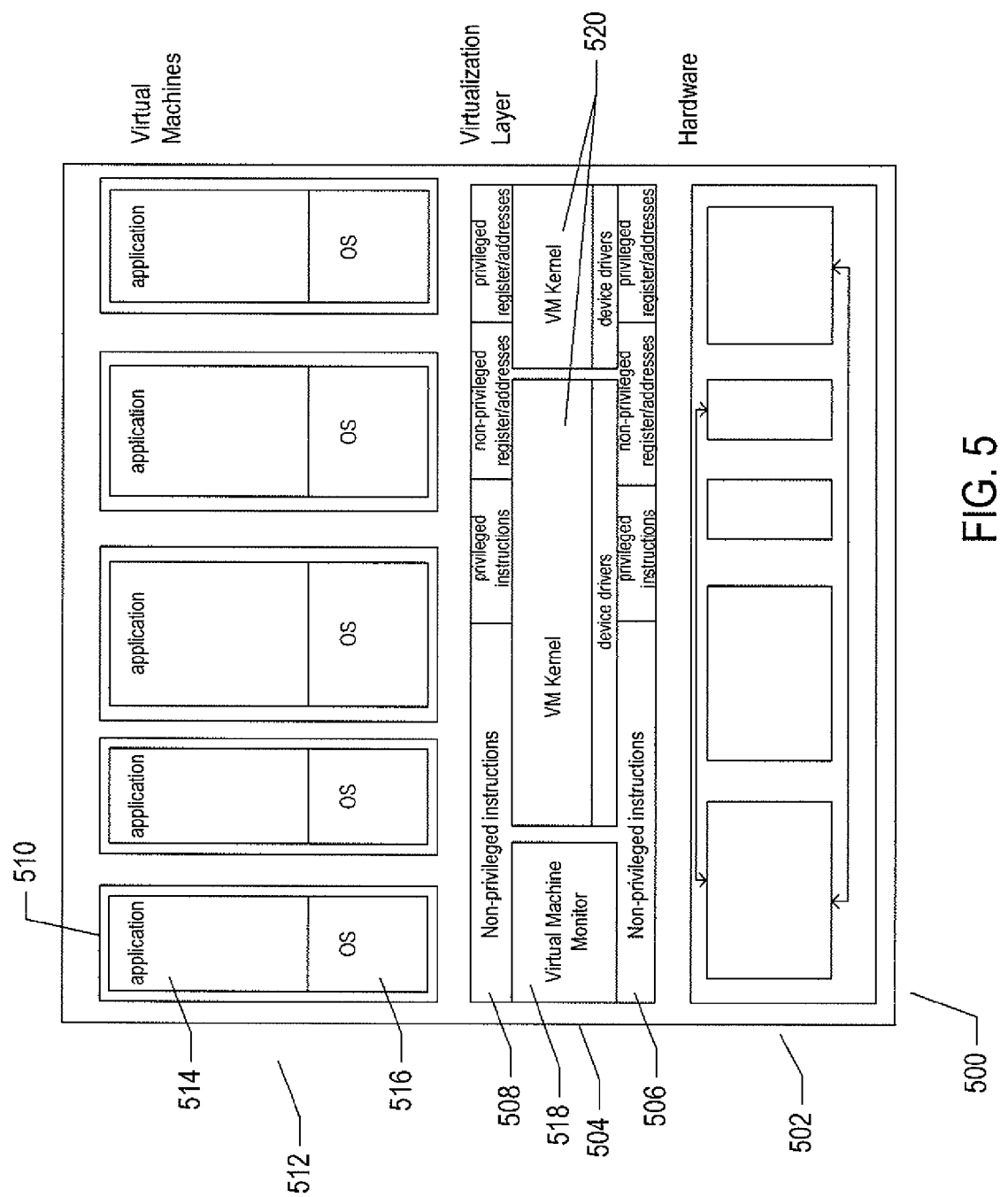
FIG. 5 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 5 illustrates one type of virtual machine and virtual-machine execution environment. FIG. 5 uses the same illustration conventions as used in FIG. 4. In particular, the computer system 500 in FIG. 5 includes the same hardware layer 502 as the hardware layer 402 shown in FIG. 4. However, rather than providing an operating system layer directly above the hardware layer, as in FIG. 4, the virtualized computing environment illustrated in FIG. 5 features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, such as application 514 and operating system 516 packaged together within virtual machine 510. Each virtual machine is thus equivalent to the operating-system layer 404 and application-program layer 406 in the general-purpose computer system shown in FIG. 4. Each operating system within a virtual machine interfaces to the virtualization-layer interface 508 rather than to the actual hardware interface 506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 6:
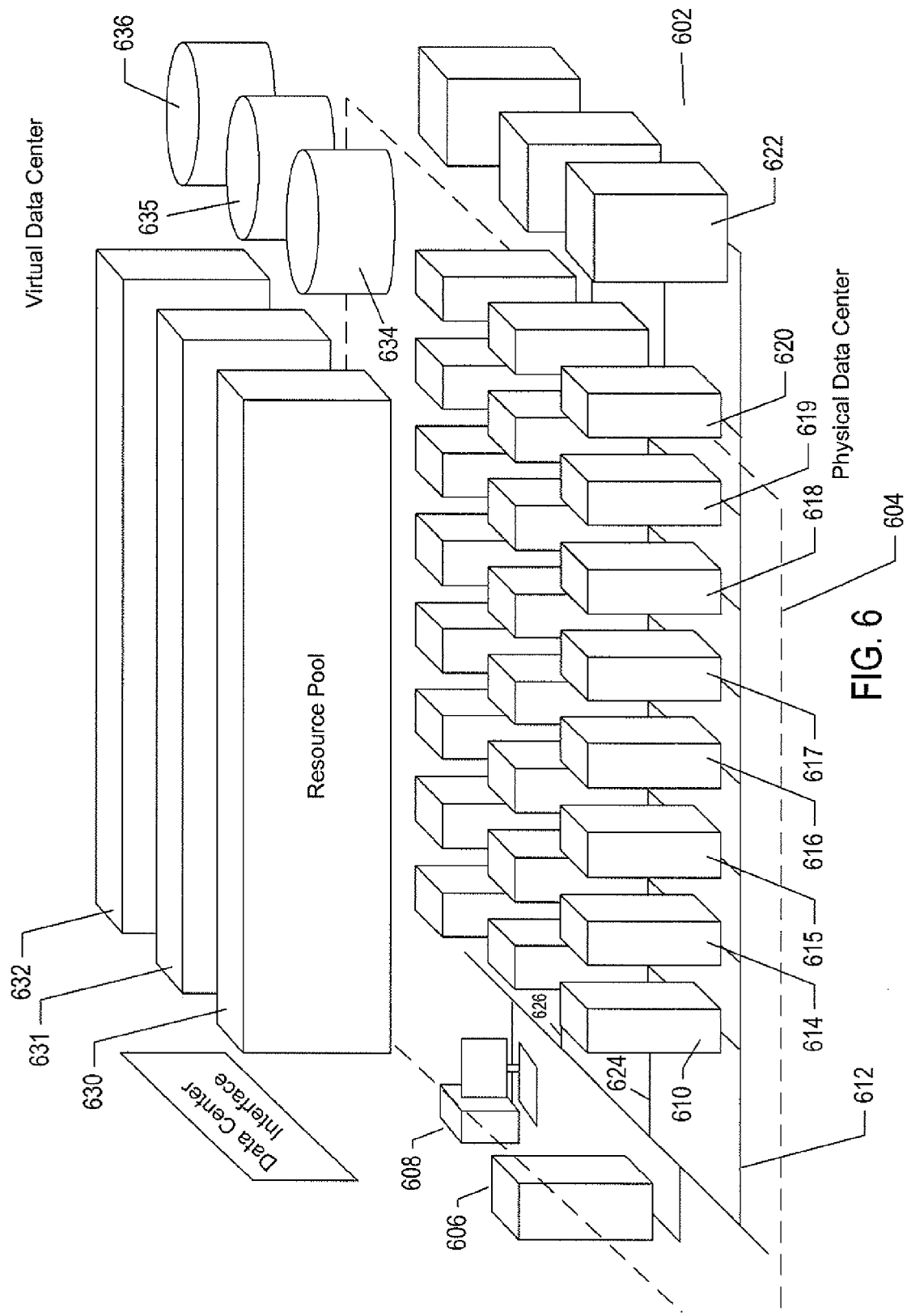
FIG. 6 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 6 illustrates virtual data centers provided as an abstraction of underlying physical-data-center hardware components. In FIG. 6, a physical data center 602 is shown below a virtual-interface plane 604. The physical data center consists of a virtual-data-center management server 606 and any of various different computers, such as PCs 608, on which a virtual-data-center management interface may be displayed to system administrators and other users. The physical data center additionally includes generally large numbers of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple virtual machines. Different physical data centers may include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 7:
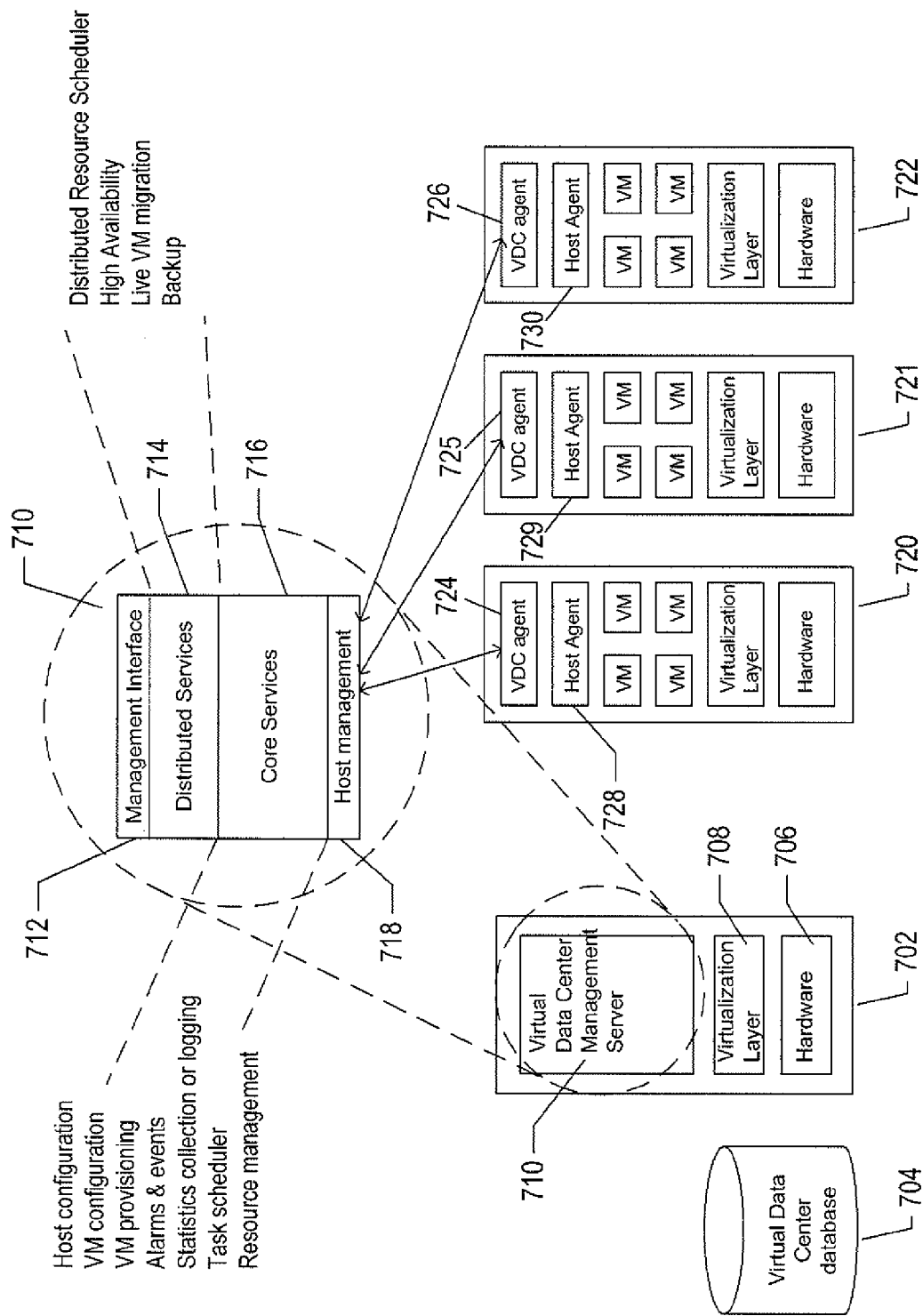
FIG. 7 illustrates virtual-machine components of a virtual-data-center management server and physical servers of a physical data center above which a virtual-data-center interface is provided by the virtual-data-center management server.

FIG. 7 illustrates virtual-machine components of a virtual-data-center management server and physical servers of a physical data center above which a virtual-data-center interface is provided by the virtual-data-center management server. The virtual-data-center management server 702 and a virtual-data-center database 704 comprise the physical components of the management component of the virtual data center. The virtual-data-center management server 702 includes a hardware layer 706 and virtualization layer 708, and runs a virtual-data-center management-server virtual machine 710 above the virtualization layer. Although shown as a single server in FIG. 7, the virtual-data-center management server ("VDC management server") may include two or more physical server computers that support multiple VDC-management-server virtual appliances. The virtual machine 710 includes a management-interface component 712, distributed services 714, core services 716, and a host-management interface 718. The management interface is accessed from any of various computers, such as the PC 608 shown in FIG. 6. The management interface allows the virtual-data-center administrator to configure a virtual data center, provision virtual machines, collect statistics and view log files for the virtual data center, and to carry out other, similar management tasks. The host-management interface 718 interfaces to virtual-data-center agents 724, 725, and 726 that execute as virtual machines within each of the physical servers of the physical data center that is abstracted to a virtual data center by the VDC management server.

The distributed services 714 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an open virtualization format ("OVF") package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 720-722 also includes a host-agent virtual machine 728-730 through which the virtualization layer can be accessed via a virtual-infrastructure application programming interface ("API"). This interface allows a remote administrator or user to manage an individual server through the infrastructure API. The virtual-data-center agents 724-726 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 8:
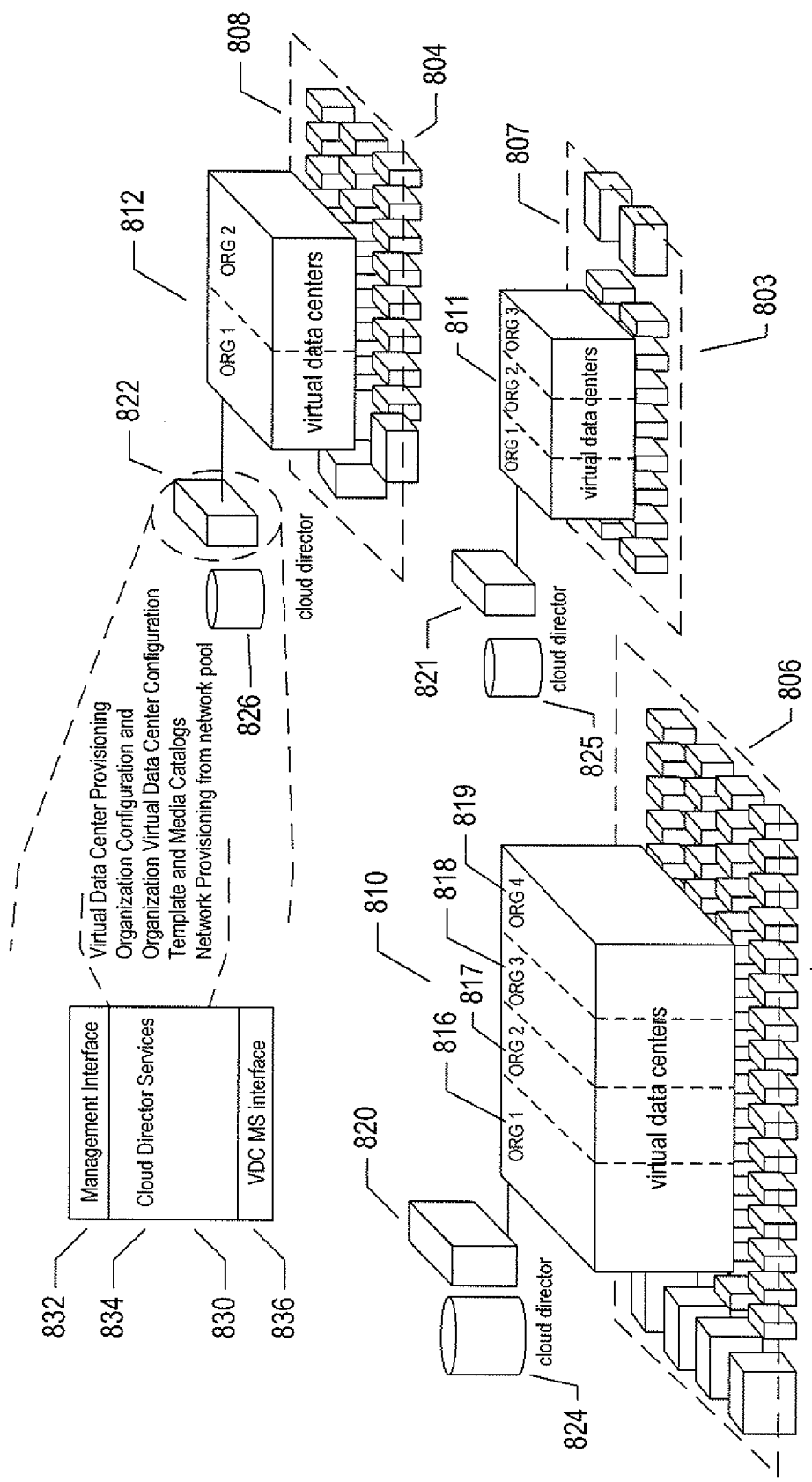
FIG. 8 illustrates a cloud-director level of abstraction.

FIG. 8 illustrates a cloud-director level of abstraction. In FIG. 8, three different physical data centers 802-804 are shown below planes representing the cloud-director layer of abstraction 806-808. Above the planes representing the cloud-director level of abstraction, multi-tenant virtual data centers 810-812 are shown. The resources of these multi-tenant virtual data centers are securely partitioned in order to provide secure virtual data centers to multiple tenants, or cloud-services-accessing organizations. For example, a cloud-services-provider virtual data center 810 is partitioned into four different tenant-associated virtual-data centers within a multi-tenant virtual data center for four different tenants 816-819. Each multi-tenant virtual data center is managed by a cloud director comprising one or more cloud-director servers 820-822 and associated cloud-director databases 824-826. Each cloud-director server or servers runs a cloud-director virtual appliance 830 that includes a cloud-director management interface 832, a set of cloud-director services 834, and a virtual-data-center management-server interface 836. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A vAPP template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Figure 9:
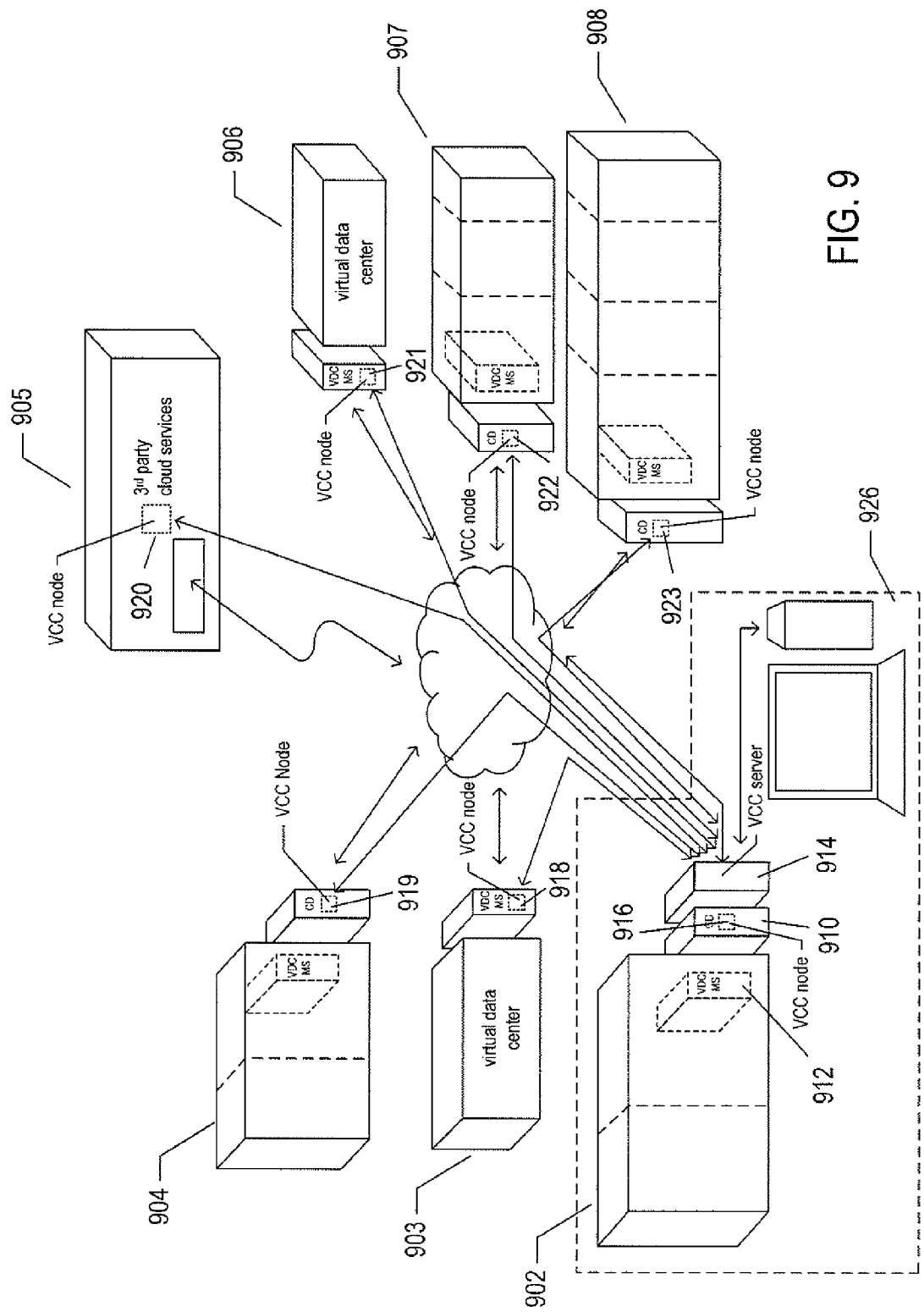
FIG. 9 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 9 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. In FIG. 9, seven different cloud-computing facilities are illustrated 902-908. Cloud-computing facility 902 is a private multi-tenant cloud with a cloud director 910 that interfaces to a VDC management server 912 to provide a multi-tenant private cloud comprising multiple tenant-associated virtual data centers. The remaining cloud-computing facilities 903-908 may be either public or private cloud-computing facilities and may be single-tenant virtual data centers, such as virtual data centers 903 and 906, multi-tenant virtual data centers, such as multi-tenant virtual data centers 904 and 907-908, or any of various different kinds of third-party cloud-services facilities, such as third-party cloud-services facility 905. An additional component, the VCC server 914, acting as a controller is included in the private cloud-computing facility 902 and interfaces to a VCC node 916 that runs as a virtual appliance within the cloud director 910. A VCC server may also run as a virtual appliance within a VDC management server that manages a single-tenant private cloud. The VCC server 914 additionally interfaces, through the Internet, to VCC node virtual appliances executing within remote VDC management servers, remote cloud directors, or within the third-party cloud services 918-923. The VCC server provides a VCC server interface that can be displayed on a local or remote terminal, PC, or other computer system 926 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Thus, as discussed above, virtualized computer systems may include a server or host with virtualization layers that support execution of virtual machines within the server or host, clusters of servers and other hardware managed by cluster management server or virtual machine as an aggregated platform for virtual-machine execution, virtual data centers managed by a virtual-data-center management server, and multi-tenant virtual data centers managed by VCC servers. The current application is directed to any level of virtual-computing abstraction that aggregates physical computational resources, including multiple hardware threads, cores, and/or processors, into resource pools from which resources are allocated to virtual machines, as well as to traditional operating systems used in multi-processor computer systems.

Figure 10:
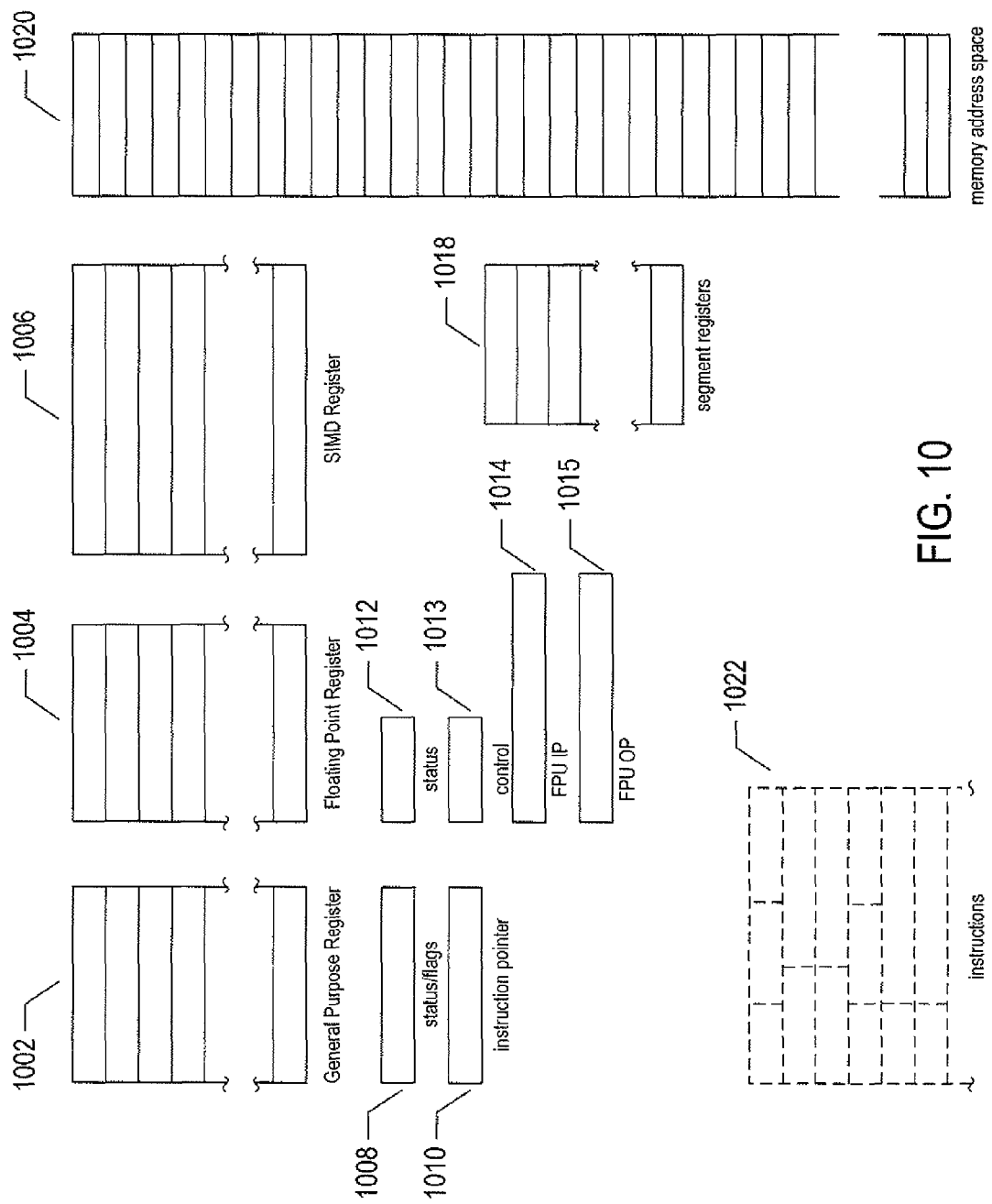
FIG. 10 illustrates an instruction-set architecture ("ISA") provided by a modern processor as the low-level execution environment for binary code and assembler code.

Next, physical computer hardware, including multi-core processors, is discussed. FIG. 10 illustrates an instruction-set architecture ("ISA") provided by a modern processor as the low-level execution environment for binary code and assembler code. The ISA commonly includes a set of general-purpose registers 1002, a set of floating-point registers 1004, a set of single-instruction-multiple-data ("SIMD") registers 1006, a status/flags register 1008, an instruction pointer 1010, special status 1012, control 1013, and instruction-pointer 1014 and operand 1015 registers for floating-point instruction execution, segment registers 1018 for segment-based addressing, a linear virtual-memory address space 1020, and the definitions and specifications of the various types of instructions that can be executed by the processor 1022. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 11:
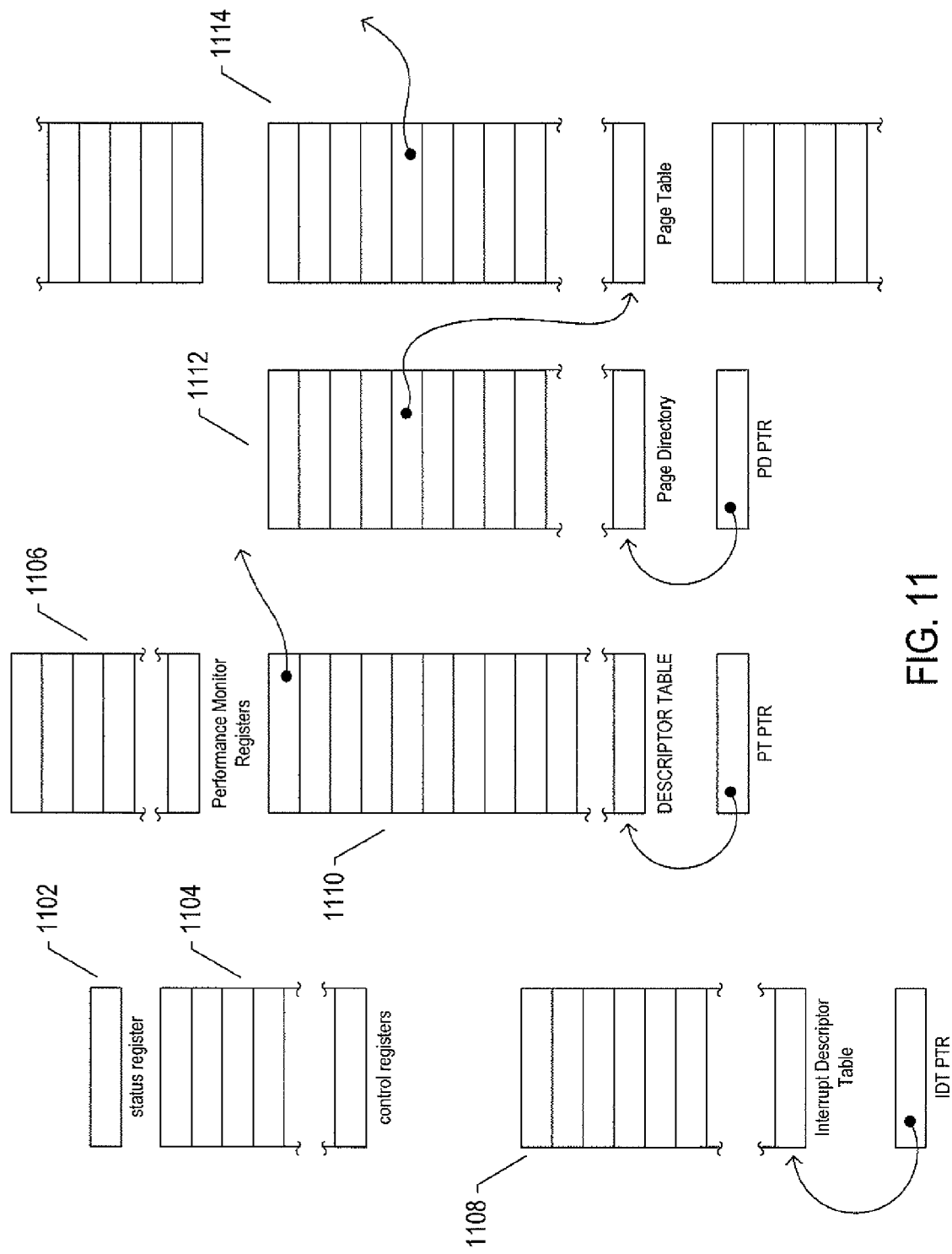
FIG. 11 illustrates an additional abstraction of processor features and resources used by virtual-machine monitors, operating systems, and other privileged control programs.

FIG. 11 illustrates an additional abstraction of processor features and resources used by virtual-machine monitors, operating systems, and other privileged control programs. These processor features, or hardware resources, can generally be accessed only by control programs operating at higher levels than the privilege level at which application programs execute. These system resources include an additional status register 1102, a set of additional control registers 1104, a set of performance-monitoring registers 1106, an interrupt-descriptor table 1108 that stores descriptions of entry points for interrupt handlers, the descriptions including references to memory descriptors stored in a descriptor table 1110. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 1112 that contains entries pointing to page tables, such as page table 1114, each of which, in turn, contains a physical memory address of a virtual-memory page.

Figure 12:
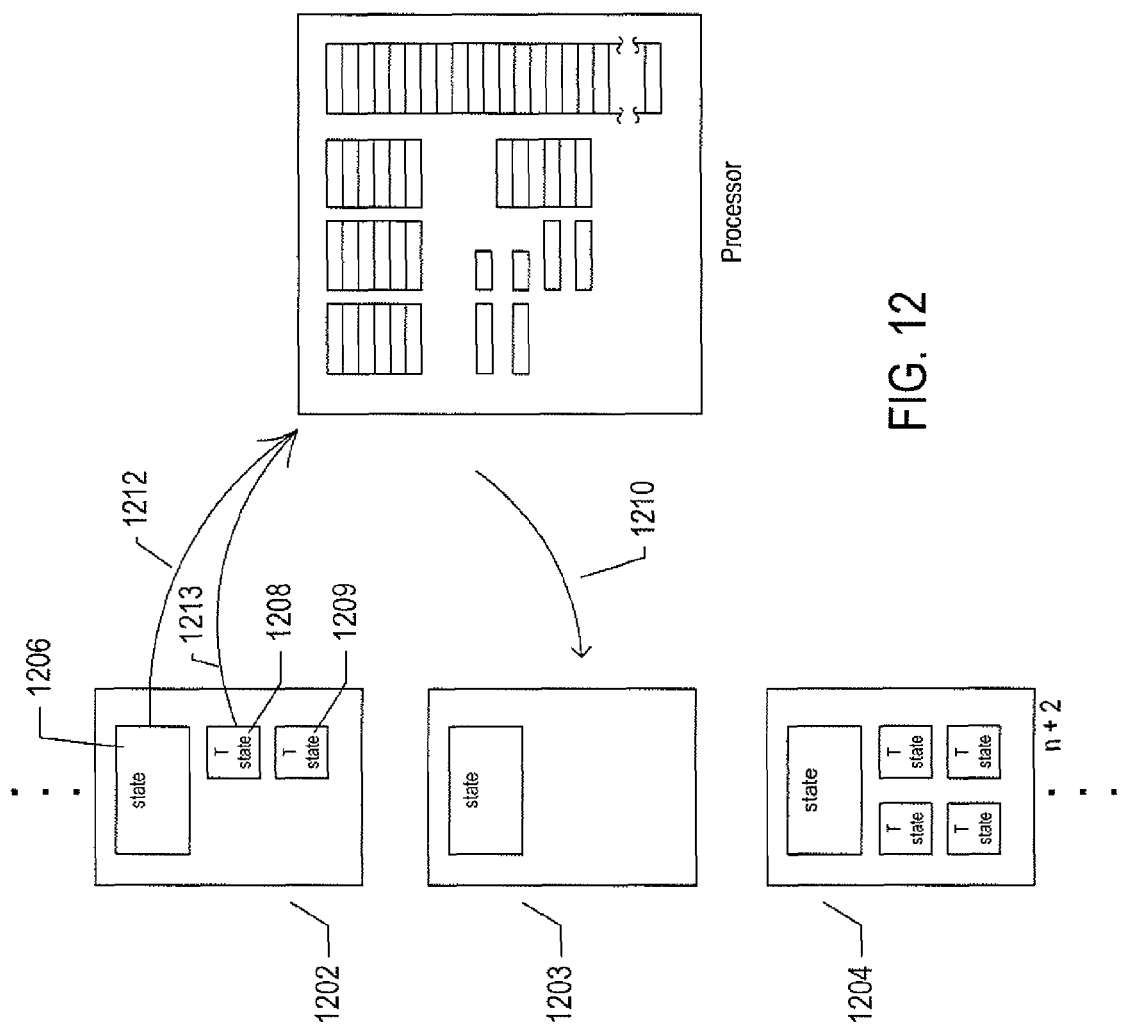
FIG. 12 illustrates a general technique for temporal multiplexing used by many operating systems.

In many modern operating systems, the operating system provides an execution environment for concurrent execution of a large number of processes, each corresponding to an executing application program, on one or a relatively small number of hardware processors by temporal multiplexing of process execution. FIG. 12 illustrates a general technique for temporal multiplexing used by many operating systems. The operating system maintains a linked list of process-context data structures, such as data structure 1202-1204, in memory. Each process-context data structure stores state information for the process, such as state information 1206 in data structure 1202, along with additional state for concurrently executing threads, such as thread states 1208-1209 in data structure 1202. The operating system generally provides blocks of time or blocks of execution cycles to the concurrently executing processes according to a process-execution-scheduling strategy, such as round-robin scheduling or various types of more complex scheduling strategies, many employing pre-emption of currently executing processes. Dormant processes are made executable by a context switch, as indicated in FIG. 12, during which a portion of the architectural state of a currently executing process is stored into an associated process-context data structure for the process, as represented by arrow 1210 in FIG. 12, and the stored portion of the architectural state of a dormant process is loaded into processor registers, as indicated by arrows 1212-1213 in FIG. 12. In general, a process is allowed to execute for some predetermined length of time or until the process is stalled or blocked, waiting for the availability of data or the occurrence of an event. When either the allotted amount of time or number of processor cycles have been used or when the process is stalled, a portion of the architectural state of the process and any concurrent threads executing within the context of the process are stored in the associated process-context data structure, freeing up the hardware resources mapped to the process in order to allow execution of a different process. In the operating-system context, threads are essentially lightweight processes with minimal thread-specific state. In many cases, each thread may have a thread-specific set of registers, but all the threads within a particular process context generally share the virtual-memory address space for the process. Thus, in general, the threads represent different execution instantiations of a particular application corresponding to the process within which the threads execute. One example of a multi-threaded application is a server application in which a new execution thread is launched to handle each incoming request. In general, an operating system may provide for simultaneous execution of as many threads as there are logical processors in the computing system controlled by the operating system. Until recently, the smallest granularity hardware resource for execution of an execution thread was an actual hardware processor. As discussed further below, in certain more recent and currently available processors, the smallest-granularity hardware resource supporting execution of a process or thread is a logical processor that corresponds to a hardware thread within an SMT processor or SMT-processor core.

Figure 13:
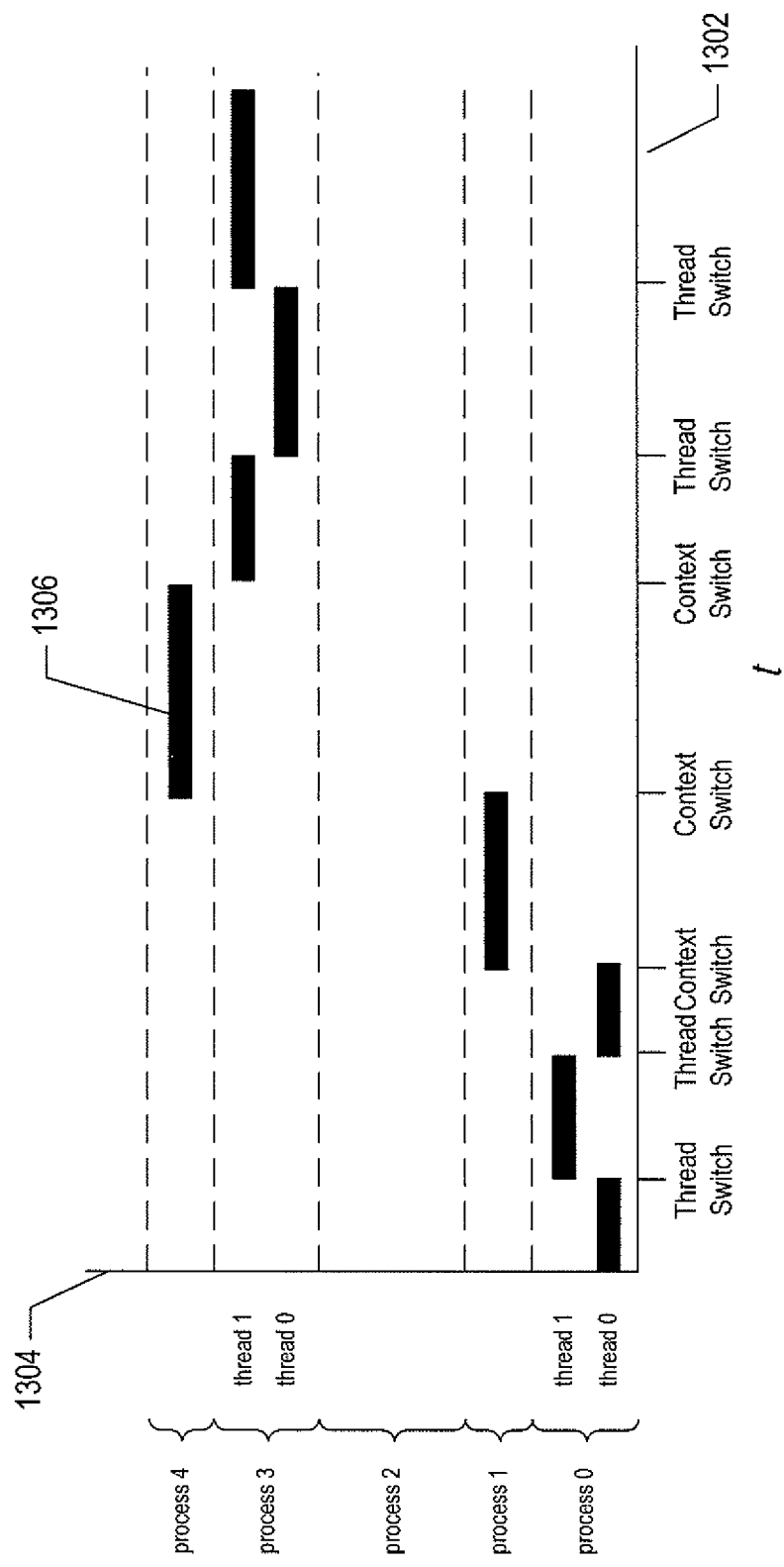
FIG. 13 illustrates temporal multiplexing of process and thread execution by an operating system with respect to a single processor or logical processor.

FIG. 13 illustrates temporal multiplexing of process and thread execution by an operating system with respect to a single processor or logical processor. In FIG. 13, the horizontal axis 1302 represents time and the vertical axis 1304 represents the various processes and threads concurrently executing on the processor or logical processor. The shaded, horizontal bars, such as shaded horizontal bar 1306, represent the period of time during which a particular process or thread executes on the processor or logical processor. As indicated along the horizontal axis, the end of one shaded horizontal bar aligns with the beginning of a different shaded horizontal bar and coincides with either a thread switch or context switch that allows execution to be transferred from one thread or process to another thread or process. The time required for the operating system to carry out a thread switch or context switch is not shown in FIG. 13, and is generally relatively insignificant in comparison to the amount of time devoted to execution of application instructions and system routines unrelated to context switching.

SMT processors, a relatively recent development in hardware architecture, provide for simultaneous execution of multiple hardware execution threads. SMT processors or SMT-processor cores provide for simultaneous hardware-execution threads by duplicating a certain portion of the hardware resources, including certain of the ISA registers, within a processor or processor core, by partitioning other of the hardware resources between hardware-execution threads, and by allowing hardware-execution threads to compete for, and share, other of the hardware resources. Modern processors are highly pipelined, and SMT processors or SMT-processor cores can often achieve much higher overall computational throughput because the various processor resources that would otherwise be idled during execution of the instructions corresponding to one hardware thread can be used by other, simultaneously executing hardware threads. Operating system threads, discussed earlier with reference to FIGS. 12 and 13, and hardware threads are conceptually similar, but differ dramatically in implementation and operational characteristics. As discussed above with reference to FIG. 13, operating-system-provided threads are products of temporal multiplexing by the operating system of hardware resources, and the temporal multiplexing involves operating-systemexecuted context switches. By contrast, hardware threads actually simultaneously execute within a processor or processor core, without hardware-thread context switches. Complex pipelined architecture of modern processors allows many different instructions to be executed in parallel, and an SMT processor or SMT-processor core allows instructions corresponding to two or more different hardware threads to be simultaneously executed.

Figure 14:
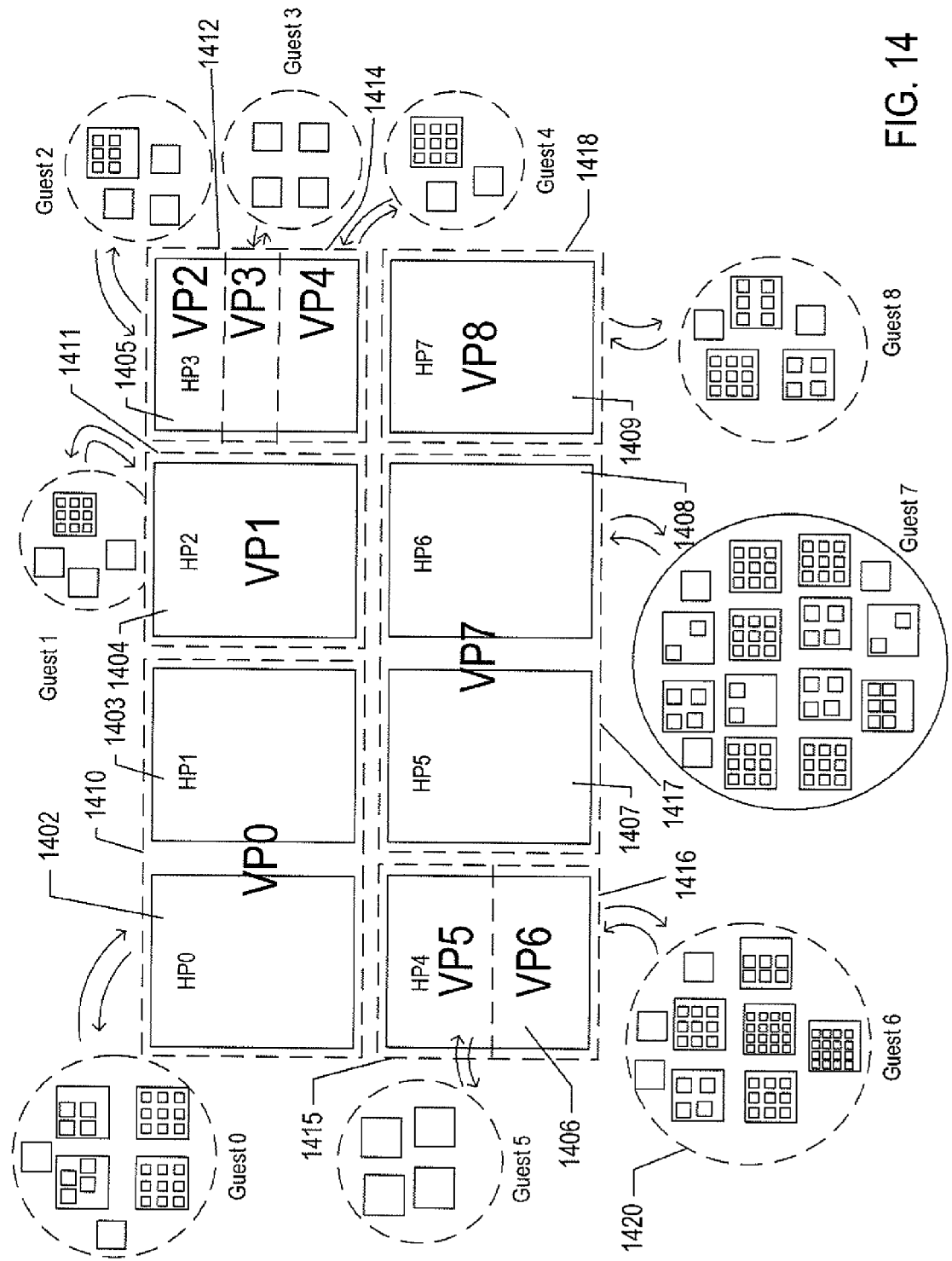
FIG. 14 illustrates an example of a complex execution environment provided by a multi-processor-based computer system in which many different processes and threads are concurrently and simultaneously executed.

FIG. 14 illustrates an example of a complex execution environment provided by a multi-processor-based computer system in which many different processes and threads are concurrently and simultaneously executed. The computer system illustrated in FIG. 14 includes eight SMT processors or processor cores HP0, HP1, . . . , HP7 1402-1409, each illustrated as rectangles with solid-line boundaries. A VMM may create a virtual-processor abstraction, mapping VMM virtual processors to hardware processing resources. In the example shown in FIG. 14, a VMM maps, as one example, virtual processor VP0 1410 to the pair of hardware processors 1402 and 1403, with the virtual processor indicated by a rectangle with dashed-line boundaries enclosing the two hardware processors. Similarly, the VMM maps virtual processor VP1 1411 to hardware processor 1404, virtual processors VP2, VP3, and VP4 1412-1414 to hardware processor 1405, virtual processors VP5 1415 and VP6 1416 to hardware processor 1406, virtual processor VP7 1417 to hardware processors 1407 and 1408, and virtual processor VP8 1418 to hardware processor 1409. In the case of SMT processors, the VMM may map, as one example, a virtual processor to each hardware thread provided by an SMT processor. For example, in the example shown in FIG. 14, virtual processors VP5 and VP6, 1415 and 1416 respectively, may each be mapped to a single hardware thread provided by SMT processor or SMT-processor core 1406. The VMM may execute a VM, including a guest operating system and one or more application programs, on each virtual processor. The guest operating system within each VM may provide an execution environment for the concurrent and/or simultaneous execution of many different processes and/or execution threads. In FIG. 14, the processes and threads executing within process contexts within the execution environment provided by a guest operating system are shown inside dashed circles, such as dashed circle 1420. Thus, a modern computer system may provide multiple, hierarchically ordered execution environments that, in turn, provide for simultaneous and/or concurrent execution of many different processes and execution threads executing within process contexts.

With the introduction of SMT processors and SMT-processor cores, the level of complexity has additionally increased. Monitoring computational throughput provided to each virtual machine in these complex environments is non-trivial, and the performance-monitoring registers and other hardware facilities provided by modern processors are generally inadequate for determining the computational throughputs for VMs mapped to hardware threads. Determination of computational throughputs for VMs managed by VMM is useful in scheduling VM execution and optimizing execution schedules as well as in accounting operations used to charge clients of large computer systems, such as cloud-computing facilities, based on the processor cycles used by the clients or on some type of measured computational throughput, often related to the rate of instruction execution provided to the clients. As further discussed below, in the case that clients are billed based on clock time during which their applications run within a cloud-computing facility, and when their applications experience performance imbalances that result in frequent stalling on exhausted resources with respect to one or VMs of another client simultaneously executing on hardware threads within an SMT processor or SMT-processor core shared by multiple clients, accounting only by clock time or even by instruction throughput may result in less-than-fair billing practices. A more fair accounting procedure would be to bill clients based on productive execution of instructions. However, current hardware performance-monitoring facilities are generally inadequate to detect many types of performance imbalance.

Figure 15:
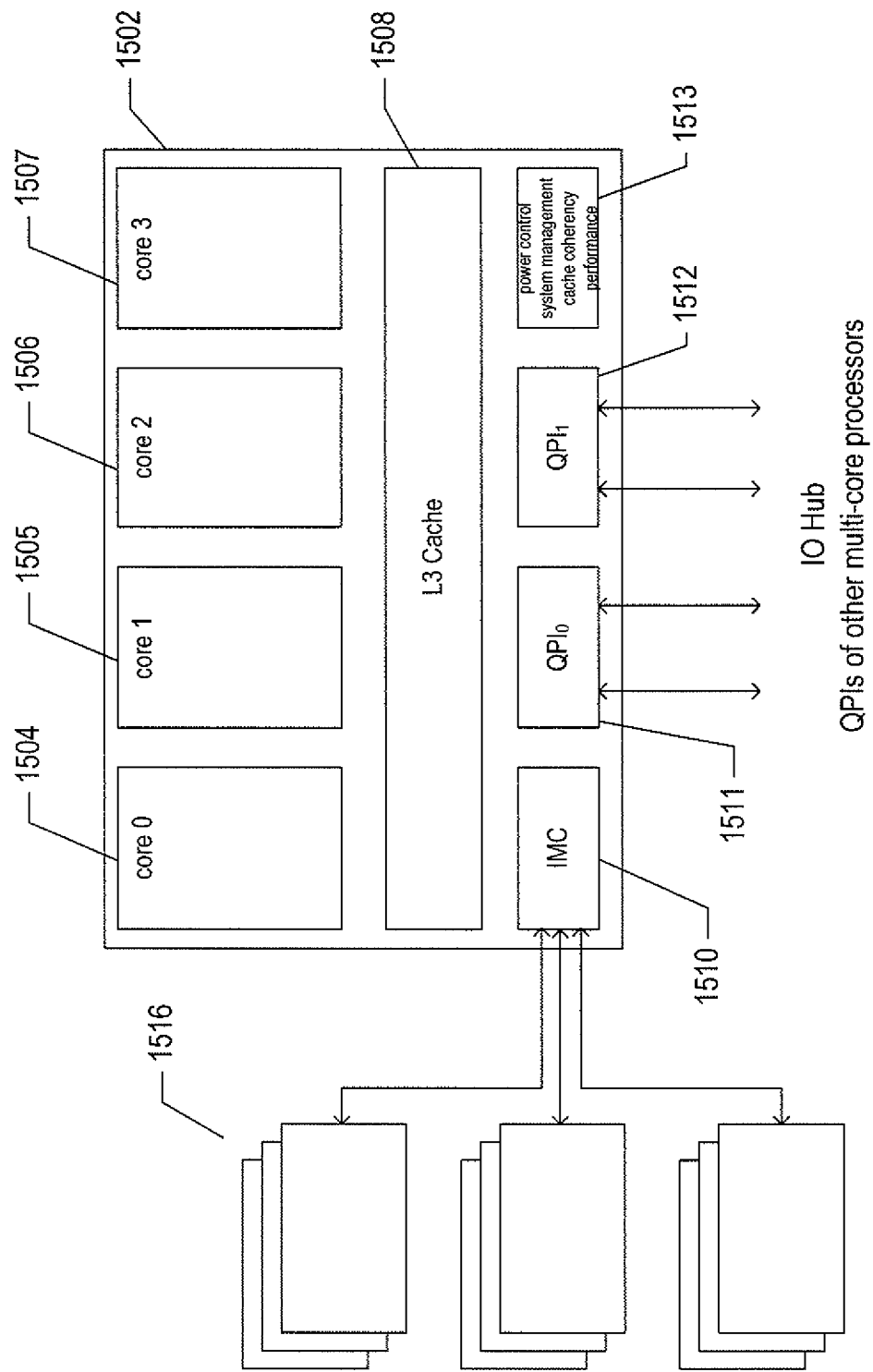
FIG. 15 illustrates an example multi-core processor.

FIG. 15 illustrates an example multi-core processor. The multi-core processor 1502 includes four processor cores 1504-1507, a level-3 cache 1508 shared by the four cores 1504-1507, and additional interconnect and management components 1510-1513 also shared among the four processor cores 1504-1507. Multi-core processors may include from two to many tens of cores, with multi-core processors containing hundreds of processors anticipated to be widely commercially available. Integrated memory controller ("IMC") 1510 manages data transfer between multiple banks of dynamic random access memory ("DRAM") 1516 and the level-3 cache ("L3 cache") 1508. As the number of cores increases, multi-core processor may include multiple memory controllers and hierarchical layers of memory controls that interface to correspondingly more complex hierarchical organizations of caches. Two interconnect ports 1511 and 1512 provide data transfer between the multi-core processor 1502 and an JO hub and other multi-core processors. A final, shared component 1513 includes power-control functionality, system-management functionality, cache-coherency logic, and performance-monitoring logic.

Each core in a multi-core processor is essentially a discrete, separate processor that is fabricated, along with all the other cores in a multi-core processor, within a single integrated circuit. As discussed below, each core includes multiple instruction-execution pipelines and internal L1 caches. In some cases, each core also contains an L2 cache, while, in other cases, pairs of cores may share an L2 cache. As discussed further, below, SMT-processor cores provide for simultaneous execution of multiple hardware threads. Thus, a multi-SMT-core processor containing four SMT-processors that each supports simultaneous execution of two hardware threads can be viewed as containing eight logical processors, each logical processor corresponding to a single hardware thread.

The memory caches, such as the L3 cache 1508 and the multi-core processor shown in FIG. 15 is generally SRAM memory, which is much faster but also more complex and expensive than DRAM memory. The caches are hierarchically organized within a processor. The processor attempts to fetch instructions and data, during execution, from the smallest, highest-speed L1 cache. When the instruction or data value cannot be found in the L1 cache, the processor attempts to find the instruction or data in the L2 cache. When the instruction or data is resident in the L2 cache, the instruction or data is provided from the L2 cache to the L1 cache. When the L1 cache is full, instruction or data within the L1 cache is evicted, or overwritten, by the instruction or data moved from the L2 cache to the L1 cache. When the data or instruction is not resident within the L2 cache, the processor attempts to access the data or instruction in the L3 cache, and when the data or instruction is not present in the L3 cache, the data or instruction is fetched from DRAM system memory. Ultimately, data and instruction are generally transferred from a mass-storage device to the DRAM memory. As with the L1 cache, when intermediate caches are full, eviction of an already-resident instruction or data generally occurs in order to copy data from a downstream cache into an upstream cache. It should be noted that, in certain types of processor architectures, cache lines may be replicated down through the cache hierarchy, while, in other processor architectures, a given cache line generally resides in a single cache within the hierarchy.

Figure 16:
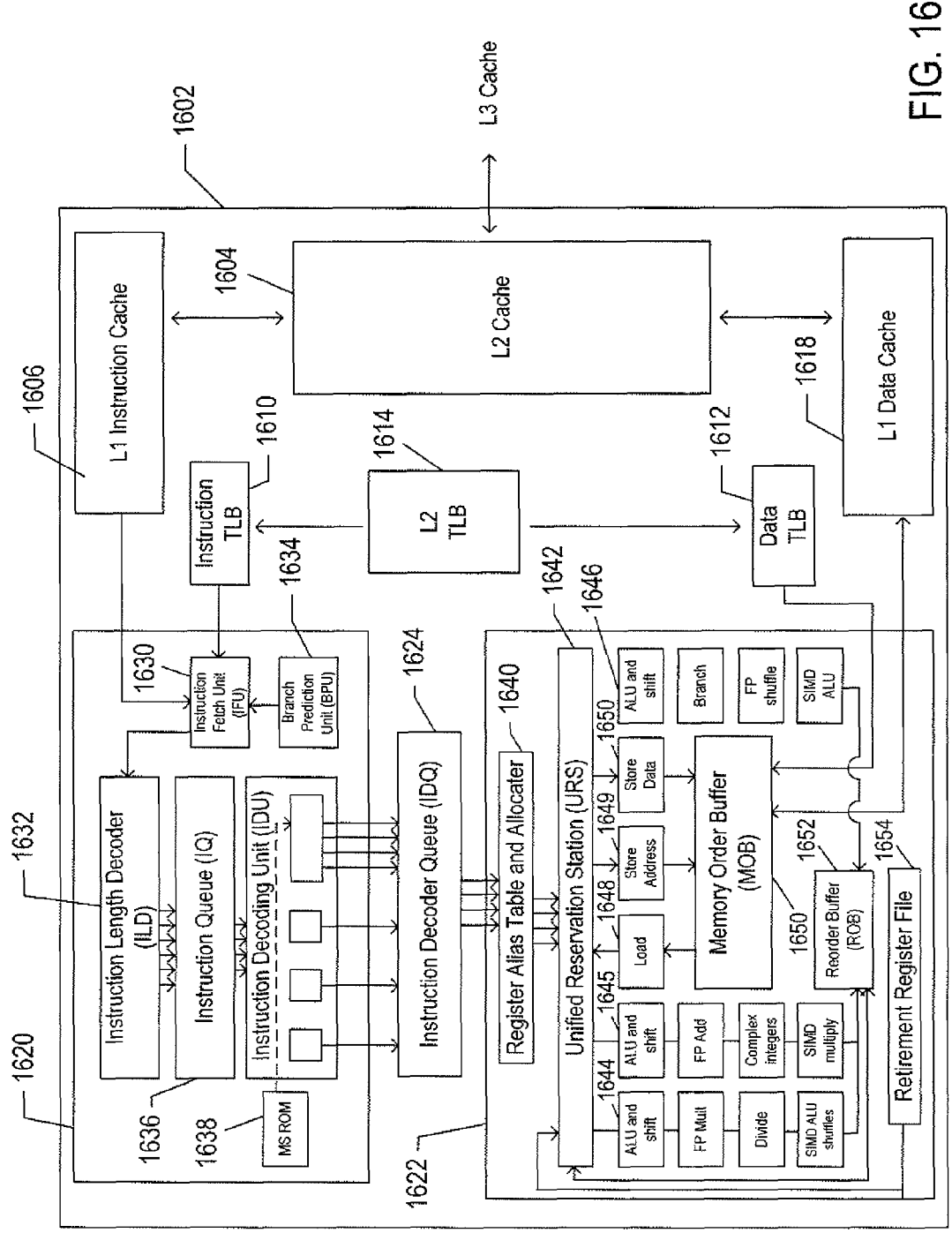
FIG. 16 illustrates the components of an example processor core.

FIG. 16 illustrates the components of an example processor core. As with the descriptions of the ISA and system registers, with reference to FIGS. 16 and 11, and with the description of the multi-core processor, with reference to FIG. 15, the processor core illustrated in FIG. 16 is intended as a high-level, relatively generic representation of a processor core. Many different types of multi-core processors feature different types of cores that provide different ISAs and different constellations of system registers. The different types of multi-core processors may use quite different types of data structures and logic for mapping virtual-memory addresses to physical addresses. Different types of multi-core processors may provide different numbers of general-purpose registers, different numbers of floating-point registers, and vastly different internal execution-pipeline structures and computational facilities.

The processor core 1602 illustrated in FIG. 16 includes an L2 cache 1604 connected to an L3 cache (1508 in FIG. 15) shared by other processor cores as well as to an L1 instruction cache 1606 and an L1 data cache 1608. The processor core also includes a first-level instruction translation-lookaside buffer ("TLB") 1610, a first-level data TLB 1612, and a second-level, universal TLB 1614. These TLBs store virtual-memory translations for the virtual-memory addresses of instructions and data stored in the various levels of caches, including the L1 instruction cache, the L1 data cache, and L2 cache. When a TLB entry exists for a particular virtual-memory address, accessing the contents of the physical memory address corresponding to the virtual-memory address is far more computationally efficient than computing the physical-memory address using the previously described page directory and page tables.

The processor core 1602 includes a front-end in-order functional block 1620 and a back-end out-of-order-execution engine 1622. The front-end block 1620 reads instructions from the memory hierarchy and decodes the instructions into simpler microinstructions which are stored in the instruction decoder queue ("IDQ") 1624. The microinstructions are read from the IDQ by the execution engine 1622 and executed in various parallel execution pipelines within the execution engine. The front-end functional block 1620 include an instruction fetch unit ("IFU") 1630 that fetches 16 bytes of aligned instruction bytes, on each clock cycle, from the L1 instruction cache 1606 and delivers the 16 bytes of aligned instruction bytes to the instruction length decoder ("ILD") 1632. The IFU may fetch instructions corresponding to a particular branch of code following a branch instruction before the branch instruction is actually executed and, therefore, before it is known with certainty that the particular branch of code will be selected for execution by the branch instruction. Selection of code branches from which to select instructions prior to execution of a controlling branch instruction is made by a branch prediction unit 1634. The ILD 1632 processes the 16 bytes of aligned instruction bytes provided by the instruction fetch unit 1630 on each clock cycle in order to determine lengths of the instructions included in the 16 bytes of instructions and may undertake partial decoding of the individual instructions, providing up to six partially processed instructions per clock cycle to the instruction queue ("IQ") 1636. The instruction decoding unit ("IDU") reads instructions from the IQ and decodes the instructions into microinstructions which the IDU writes to the IDQ 1624. For certain complex instructions, the IDU fetches multiple corresponding microinstructions from the MS ROM 1638.

The back-end out-of-order-execution engine 1622 includes a register alias table and allocator 1640 that allocates execution-engine resources to microinstructions and uses register renaming to allow instructions that use a common register to be executed in parallel. The register alias table and allocator component 1640 then places the microinstructions, following register renaming and resource allocation, into the unified reservation station ("URS") 1642 for dispatching to the initial execution functional units 1644-1646 and 1648-1650 of six parallel execution pipelines. Microinstructions remain in the URS until all source operands have been obtained for the microinstructions. The parallel execution pipelines include three pipelines for execution of logic and arithmetic instructions, with initial functional units 1644-1646, a pipeline for loading operands from memory, with initial functional unit 1648, and two pipeline, initial functional units 1649-1650, for storing addresses and data to memory. A memory-order buffer ("MOB") 1650 facilitates speculative and out-of-order loads and stores and ensures that writes to memory take place in an order corresponding to the original instruction order of a program. A reorder buffer ("ROB") 1652 tracks all microinstructions that are currently being executed in the chains of functional units and, when the microinstructions corresponding to a program instruction have been successfully executed, notifies the retirement register file 1654 to commit the instruction execution to the architectural state of the process by ensuring that ISA registers are appropriate updated and writes to memory are committed.

A processor core is, of course, an exceedingly complex device, containing a forest of signal paths and millions of individual transistors and other circuit components. The myriad components and operational details are far beyond the scope of the current discussion. Instead, the current discussion is intended to provide a context for the performance-imbalance-monitoring registers included within a processor in order to facilitate performance monitoring with respect to hardware threads.

Figure 17:
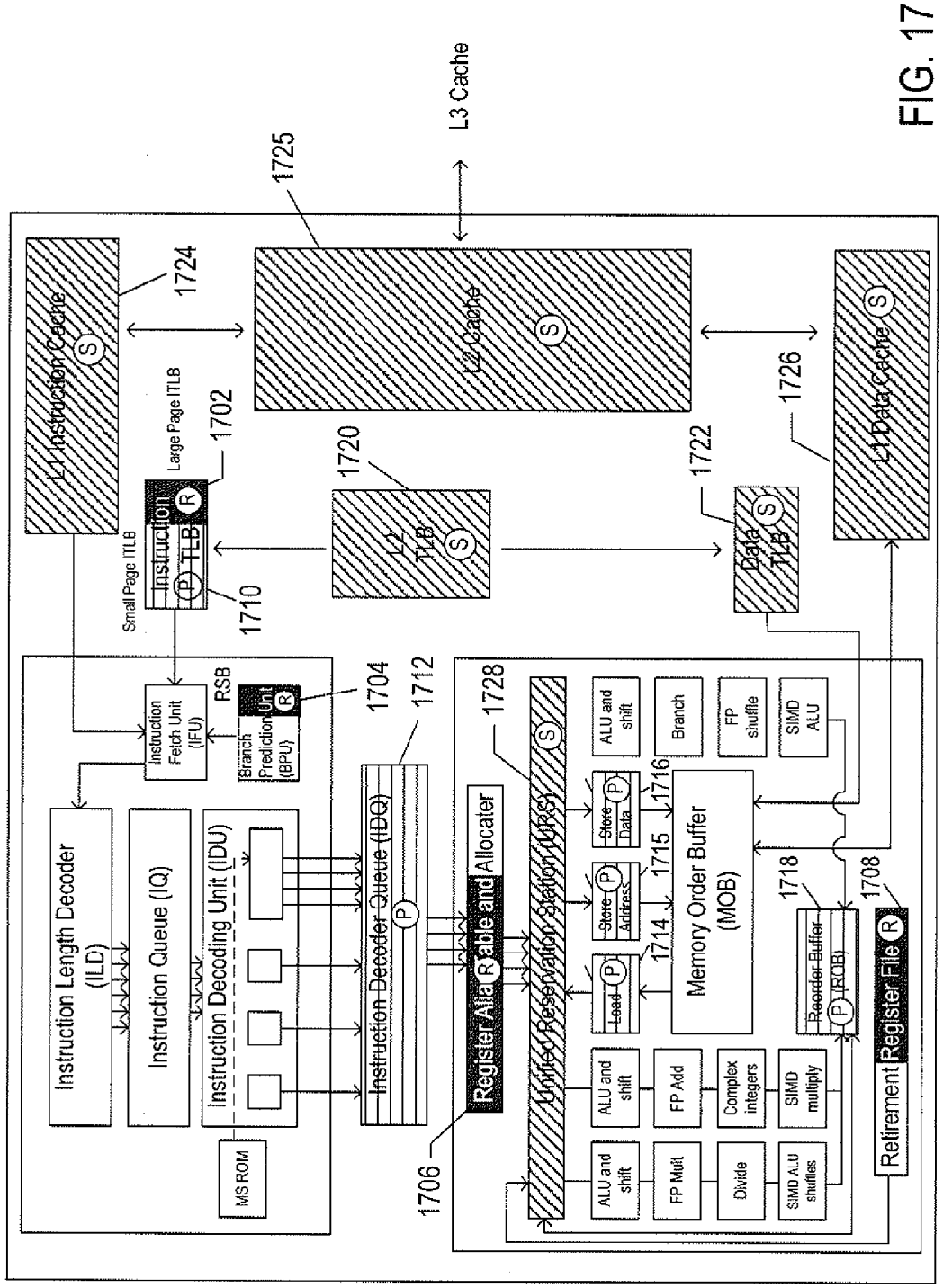
FIG. 17 illustrates, using the illustration conventions employed in FIG. 10, certain of the modifications to the processor core illustrated in FIG. 10 that enable two hardware threads to concurrently execute within the processor core.

FIG. 17 illustrates, using the illustration conventions employed in FIG. 16, certain of the modifications to the processor core illustrated in FIG. 16 that enable two hardware threads to concurrently execute within the processor core. There are four basic approaches employed to prepare hardware components for multi-threading. In a first approach, the hardware components are used identically in an SMT-processor core as they are used in a processor core that does not support simultaneous execution of multiple threads. In FIG. 17, those components that are not altered to support similar threads are shown identically as in FIG. 16. In a second approach, certain of the functional components of the microprocessor may be replicated, each hardware thread exclusively using one replicate. Replicated components are shown in FIG. 17 with shading as well as a circled "R." A portion of the first-level instruction TLB 1702 is replicated, as is the return-stack-buffer portion of the BPU 1704. The register alias table is replicated 1706 and, of course, the architecture state embodied in the register file is replicated 1708, with each hardware thread associated with its own architecture state. Yet another strategy is to partition the particular functional components, allowing a particular hardware thread to access and employ only a portion of the functional component. In FIG. 17, those functional components that are partitioned among hardware threads are indicated by a circled "P" and horizontal cross-hatching. Partitioned components include a portion of the first-level instruction TLB 1710, the IDQ 1712, load and store buffers 1714-1716, and the reorder buffer 1718. The partitioning may be a hard, fixed partitioning in which each of n hardware threads can access up to 1/n of the total functionality provided by the component, or may be a more flexible partitioning in which each hardware thread is guaranteed access to some minimal portion of the resources provided by the functional component, but the portion actually employed at any given point in time may vary depending on the execution states of the hardware threads. Finally, functional components may be shared, with the hardware threads competing for the resources provided by the functional component. Shared components are indicated in FIG. 17 by diagonal cross-hatching and circled "S" symbols. The shared components include the second-level TLB 1720, the data TLB 1722, the L1 and L2 caches 1724-1726, and the URS 1728. In certain cases, a very minimal portion of the resource provided by a shared component may be guaranteed to each hardware thread.

Those functional components that are not altered, the functional components that are replicated, with each hardware thread exclusively accessing its own copy, and the functional components that are strictly partitioned are not generally associated with thread-specific performance-monitoring problems. However, the functional components that are either flexibly partitioned or shared may be difficult to monitor in order to provide useful hardware-thread-specific performance-monitoring data. The performance-imbalance-monitoring registers which the current application discloses are therefore most usefully applied to flexibly partitioned and shared functional units of an SMT-processor core. The following discussion provides a high-level description of performance-imbalance-monitoring registers that are added to an SMT processor or SMT-processor core to supplement, according to the current application, the existing performance-monitoring registers of a processor in order to facilitate thread-specific monitoring.

Memory-Access Resource Management Systems and Methods

Figure 18:
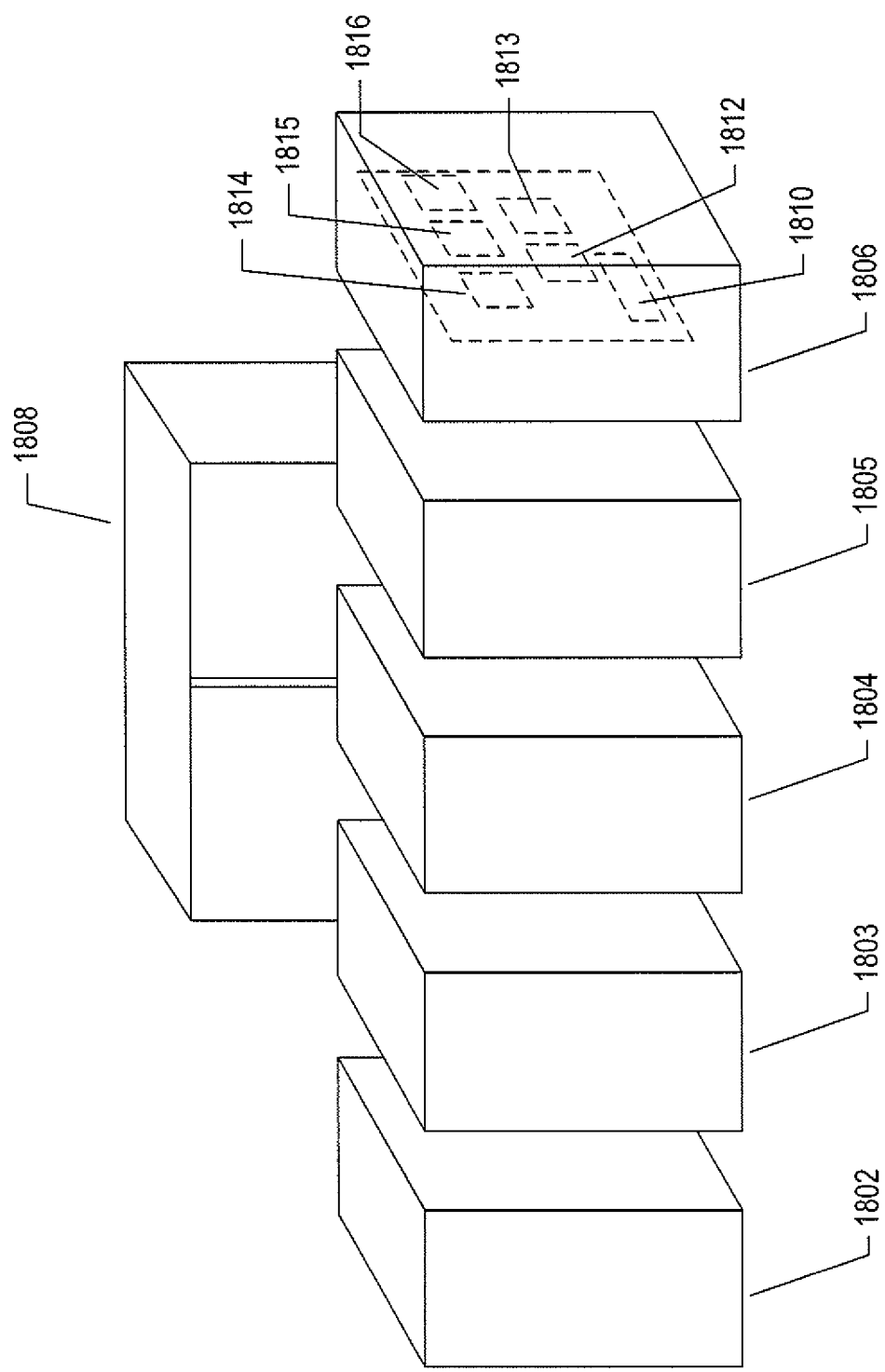
FIGS. 18-23 illustrate a resource pool.

FIGS. 18-23 illustrate a resource pool, discussed briefly, above, with reference to FIG. 6. FIG. 18 shows a small cluster of physical computing machinery. In FIG. 18, five multi-processor servers 1802-1806 are shown along with a large data-storage-array enclosure 1808. Each of the server computers includes one or more network interconnect cards ("NICs") 1810, two or more processors 1812-1813, and generally multiple banks of integrated-circuit memory 1814-1816. The internal components of server 1806 are shown, in FIG. 18, as an example of the types of components contained within the remaining servers 1802-1805. Of course, server computers and storage arrays are extremely complex machines with hundreds to thousands of individual parts and subcomponents. FIG. 18 is intended only to illustrate the computing cluster at a high level.

Figure 19:
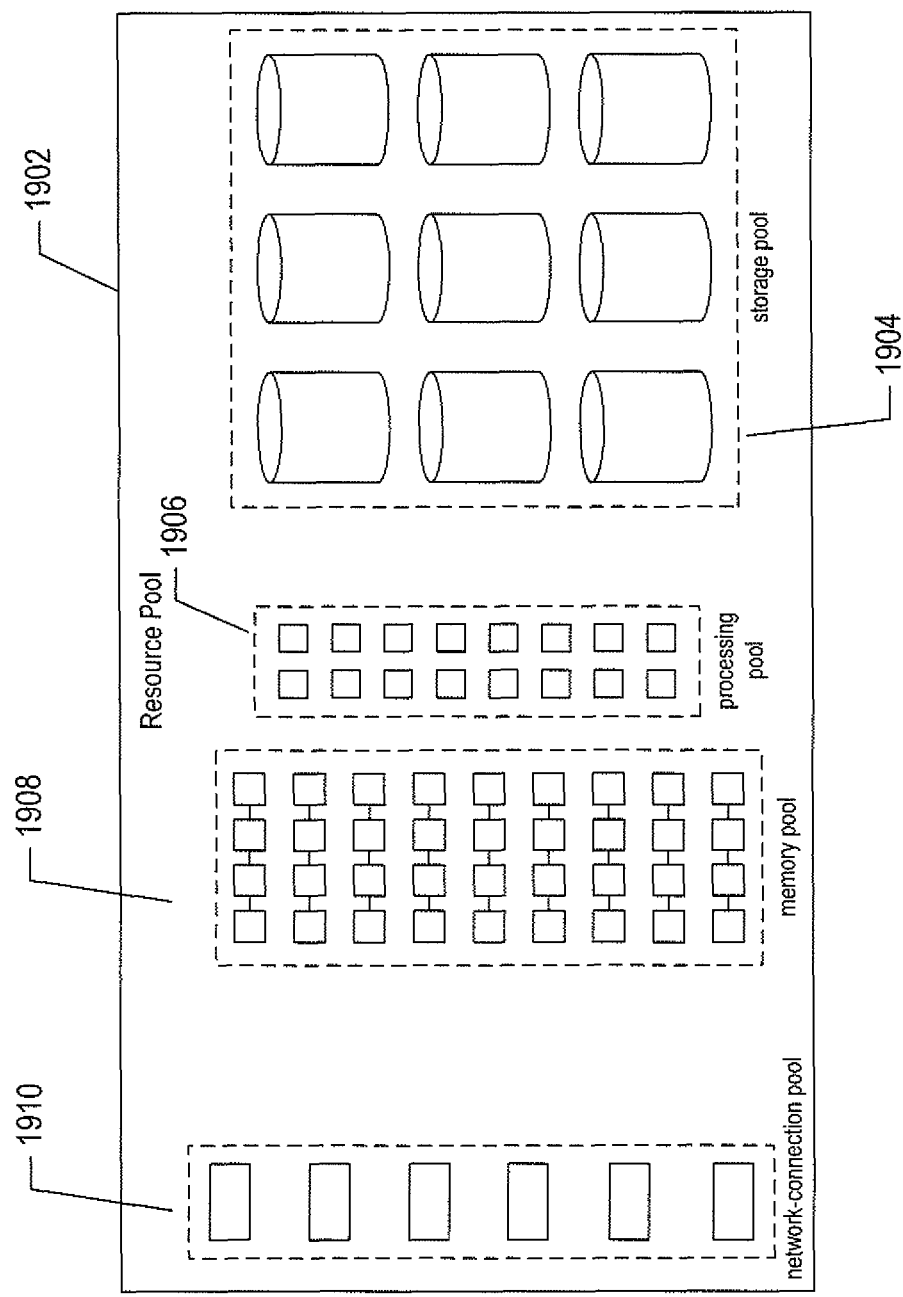

FIG. 19 illustrates abstraction of the computing resources contained in the cluster shown in FIG. 18 as a resource pool. The resource pool 1902 includes a data-storage pool 1904, a processing pool 1906, a memory pool 1908, and a network-connection pool 1910. The storage pool 1904 is an abstract collection or aggregation of all of the data-storage resources of the cluster available to virtual machines for data storage, including portions of internal disk drives within the server computers as well as disk drives and other data-storage devices within the data-storage array 1808. The processing pool 1906 is an abstract aggregation of the processing bandwidth provided by hardware threads, cores, and processors within the server computers 1802-1806. Similarly, the memory pool 1908 includes all of the memory resources contained in both the server computers 1802-1806 that are accessible for use by virtual machines. The network-connection pool 1910 is an abstract aggregation of all the NICs and/or other communications hardware within the server computers 1802-1806 available for transmitting and receiving data at the request of virtual machines. The resource-pool abstraction represents, to virtual machines within a virtualized computer system, an overall, aggregate set of resources that can be accessed by the virtual machines without specifying the types and numbers of individual devices and components that are aggregated together provide the overall bandwidth and/capacity of the various component pools of the resource pool.

Figure 20:
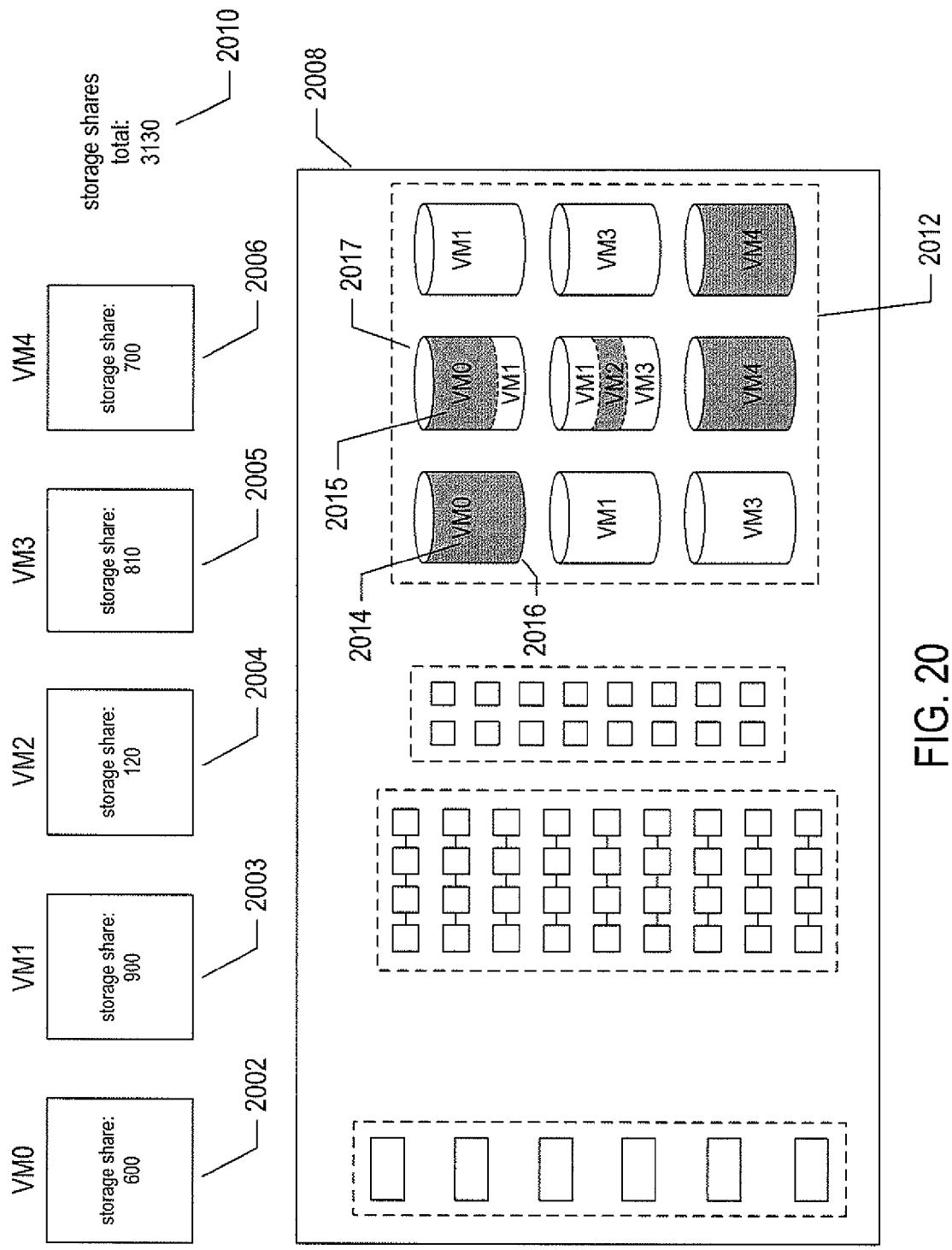

FIG. 20 illustrates allocation of resources from a resource pool to virtual machines within a virtual cluster, virtual data center, or other virtualized computer system by a cluster-management server, virtual-data-center management server, VCC server, or other such virtualized-computer-system management component. In FIG. 20, five different virtual machines 2002-2006 are represented by rectangles. These virtual machines execute within a cluster from which a resource pool 2008 is abstracted. Each virtual machine is allocated a number of storage shares indicated within the rectangles representing the virtual machines 2002-2006 in FIG. 20. A total of 3130 storage shares 2010 are thus allocated among the virtual machines. These storage-share allocations represent the priority, importance, or weighting of the virtual machines with respect to use of the data-storage resources of the cluster represented by the storage-pool component 2012 of the resource pool 2008. When multiple virtual machines are competing to allocate data-storage space, each of the virtual machines is provided data-storage space according to a priority or weighting computed as the relative proportion of the storage shares allocated to the virtual machine with respect to the total allocated shares. For example, as shown in FIG. 20, were the five illustrated virtual machines to begin operation in the cluster prior to data-storage allocations to any of the virtual machines, and were the virtual machines to compete, over a period of time, for data-storage allocations, then, ultimately, the relative portions of the total data-storage capacity of a cluster would end up allocated to each virtual machines according to each virtual machine's portion of the total number of allocated shares. Because virtual machine 0 is allocated 600 shares from the total number of shares 3130, virtual machine 0 would end up with (600/3130)×100=19.2% of the total data-storage resource. Because the total data-storage resource is represented as nine virtual disks in FIG. 20, virtual machine 0 would end up with 1.72 virtual disks 2014-2015, as indicated by the shaded portions of the first two virtual disks 2016-2017 labeled "VM 0." In practice, because of the dynamic nature of virtual-machine execution and scheduling as well as the dynamic nature of resource allocations and of the characteristics of a virtual computer system, the amount of data storage allocated, at any given time, to each of the virtual machines does not reflect the relative proportion of the total number of data-storage shares held by the virtual machine. The shares held by a virtual machine reflect the priority with which a virtual machine is granted allocation requests, rather than the total amount of the data-storage resource that ends up allocated to the virtual machine. When a VM fails to allocate a portion of a resource or resource pool corresponding to the shares allocated to the VM, other VMs may allocate additional resources beyond their proportion of allocated shares. Shares of other types of computational resources, including processing bandwidth, memory capacity, and networking bandwidth, are similarly allocated to virtual machines by a management layer within a virtualized computer system.

Figure 21:
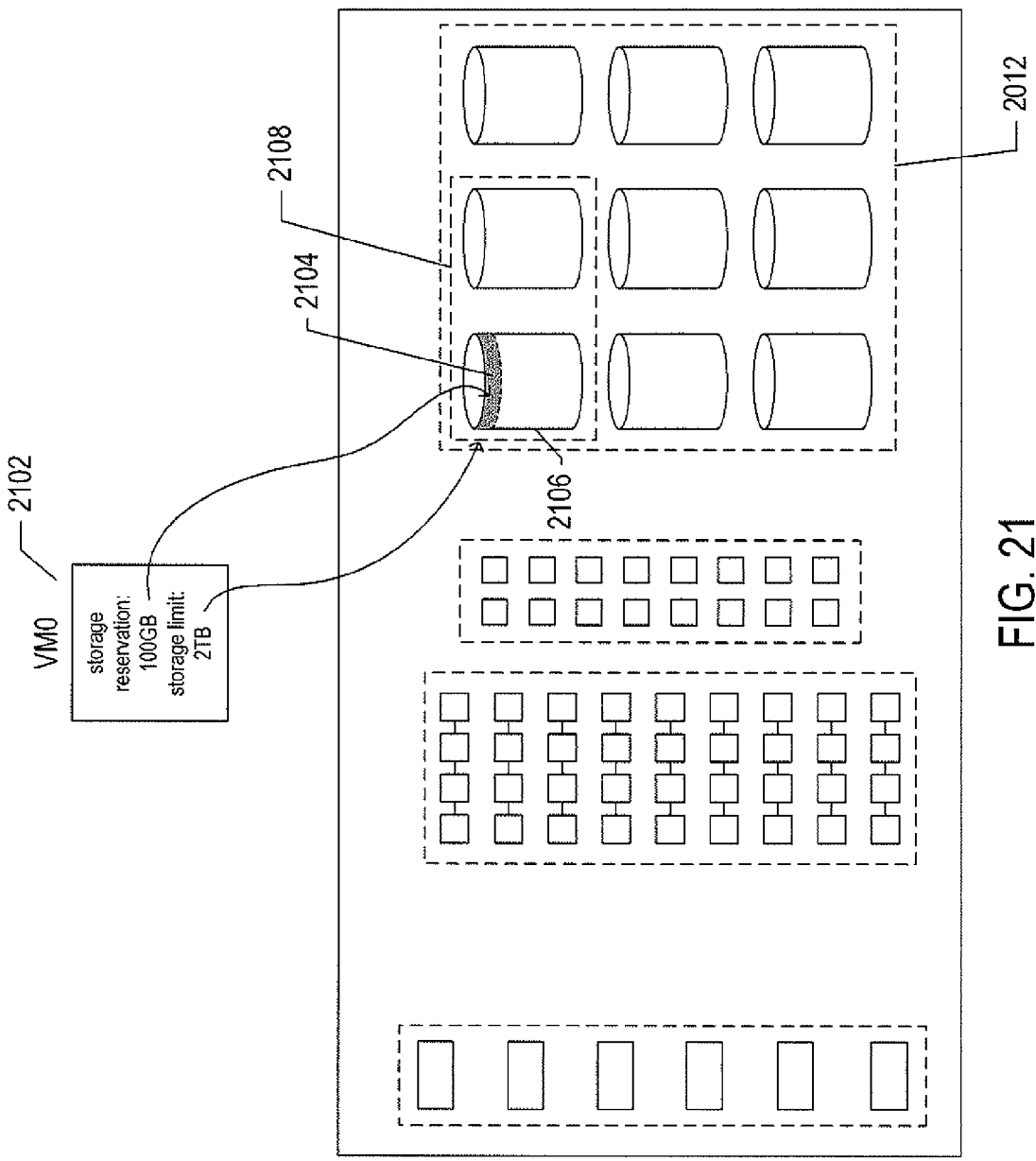

FIG. 21 illustrates the concept of resource reservation and resource limits. In addition to allocating shares to virtual machines, a management server or management layer within a virtualized computer system may also assign to each virtual machine both a capacity or bandwidth reservation and a capacity or bandwidth limit, depending on the type of resource. For example, as shown in FIG. 21, virtual machine 0 2102 has been assigned a data-storage reservation of 100 gigabytes ("GB") and a data-storage limit of 2 terabytes ("TB"). Assuming each of the virtual disks in the data-storage pool 2012 has a total capacity of one terabyte, the data-storage reservation represents a total amount of data storage corresponding to the shaded portion 2104 of the first virtual disk 2106 while the data-storage limit of two TB represents the total data-storage capacity of two virtual disks, as represented by dashed rectangle 2108. The data-storage reservation is an indication of the minimum amount of data-storage capacity that needs to be available, in the resource pool, for virtual machine 0 in order to launch execution of virtual machine 0. The data-storage limit represents the total amount of data-storage capacity within the virtualized computer system that can be allocated to virtual machine 0. Each virtual machine can be assigned a reservation and limit, in addition to a number of shares, with respect to each of the various types of resources represented as resource-pool components of the overall resource pool (2008 in FIG. 20).

Figures 22, 23:
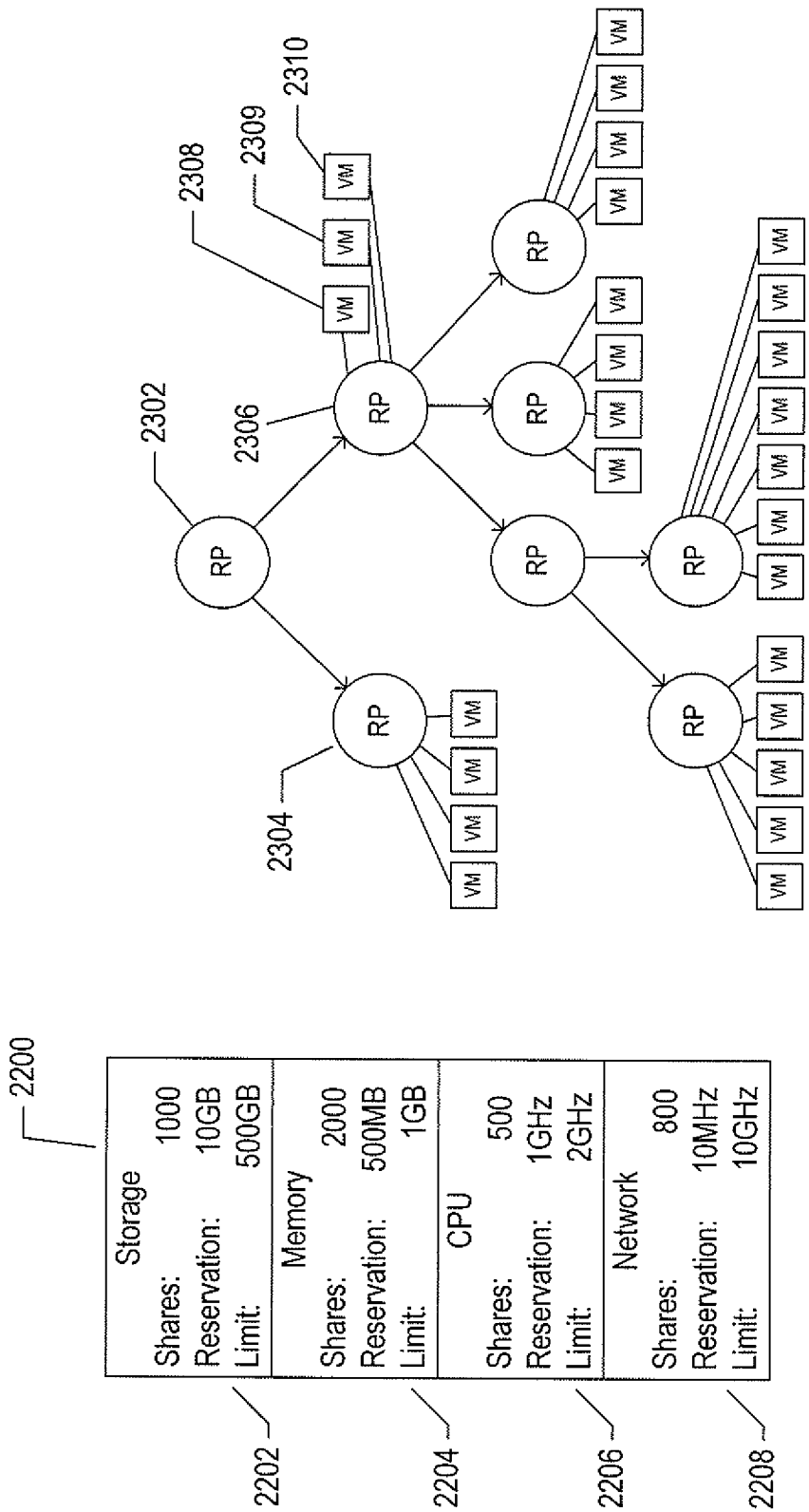

FIG. 22 illustrates a set of resource allocations to a particular virtual machine. These include allocated shares, reservations, and limits for data storage 2202, memory 2204, processing bandwidth 2206, and networking bandwidth 2208. The resource allocations encoded in the data structure 2200 shown in FIG. 22 may be incorporated within, or may be a component of, a description of a virtual machine that is used by a management server or management layer to manage execution of the virtual machine.

FIG. 23 illustrates the hierarchical nature of resource pools. The total, aggregated, usable computing resources of a cluster or data center may be represented by a root-node resource pool 2302. Using virtualized-computer-system administrative tools, this root-node resource pool may be hierarchically partitioned into immediate child resource pools 2304 and 2306, each of which may be, in turn, partitioned into additional, lower-level resource pools, with the partitioning continuing to arbitrary, desired level. The child resource pools represent portions of a parent resource pool. During system operation, child resource pools may be allocated additional bandwidth or capacity from the parent resource pool when additional capacity and bandwidth is available. Virtual machines are associated with resource pools. For example, virtual machines 2308-2310 are associated with the second-level resource pool 2306 which is a child of the root-node resource pool 2302. Hierarchical partitioning of resource pools provides system administrators the ability to partition aggregate computing resources in a fine-grained, hierarchical fashion amongst various different classes of virtual machines within the virtualized computer system.

Returning to FIG. 15, it can be seen that all of the cores in a multi-core processor 1502 end up sharing a single memory controller 1510 through which the cores access system memory 1516. Memory accesses by cores result in writing of data from local caches to local memory 1516 or writing data from system memory 1516 to the local caches. Like the memory controller 1510, the L3 cache 1508 is also shared among all four cores. When a virtual machine is executing on each core or hardware thread within each core, different virtual machines may be currently accessing local memory through the single memory controller and associated data-transmission paths between local memory, the L3 cache, and other components of the multi-core processor. Because of the inherent multiplexing nature of the memory controller, memory bus, and other components of the multi-core processor, a single virtual machine executing on a hardware thread or core within the multi-core processor may, through frequent and/or large-volume memory accesses, end up monopolizing a large portion of the total memory-subsystem bandwidth available to the multi-core processor, to the detriment of other virtual machines executing in other hardware threads and/or cores within the multi-core processors. Currently, only very coarse-grained control of memory accesses by virtual machines within multi-core processors is available to various types of virtualized-computer-system managers in order to attempt to provide a reasonable level of access to each of multiple concurrently and simultaneously executing virtual machines within a multi-core processor. For example, a management server may use performance-monitoring data provided by modern processors to detect long cache and/or TLB latencies as well as high CPU utilization due to frequent memory stalls and infer, from the data, that these cores may be receiving less than a fair share of the total memory-access bandwidth available to the cores of a multi-core processor. Alternatively, application-level throughput can be measured, at system levels, with degradation in application throughput serving as one indication of performance-lowering memory-bandwidth contention. However, performance-monitoring-based control has significant lag times and may be based on inferences drawn from incomplete data, as a result of which it is currently not possible to accurately and reliably provide specified allotments of memory-access bandwidth to particular virtual machines simultaneously executing on a multi-core processor. As discussed above, a portion of various aggregated resources, including data-storage, memory, networking, and processor resources used by virtual machines may be controlled through the resource-pool administrative interface, but, viewing the memory controller and associated components as a memory-access resource, it is not currently possible to administer the memory-access resource in the same fashion as data-storage capacity, memory capacity, networking bandwidth, and processing bandwidth.

The current application is directed to methods and systems for providing fine-grained, immediate, and direct control over multiplexing of memory-access resources among virtual machines executing within a multi-core processor. These methods and systems can be extended, in a straightforward manner, to many other types of physical resources and subsystems within processors and other components of computer systems for which simultaneously and concurrently executing virtual machines contend.

Figure 24:
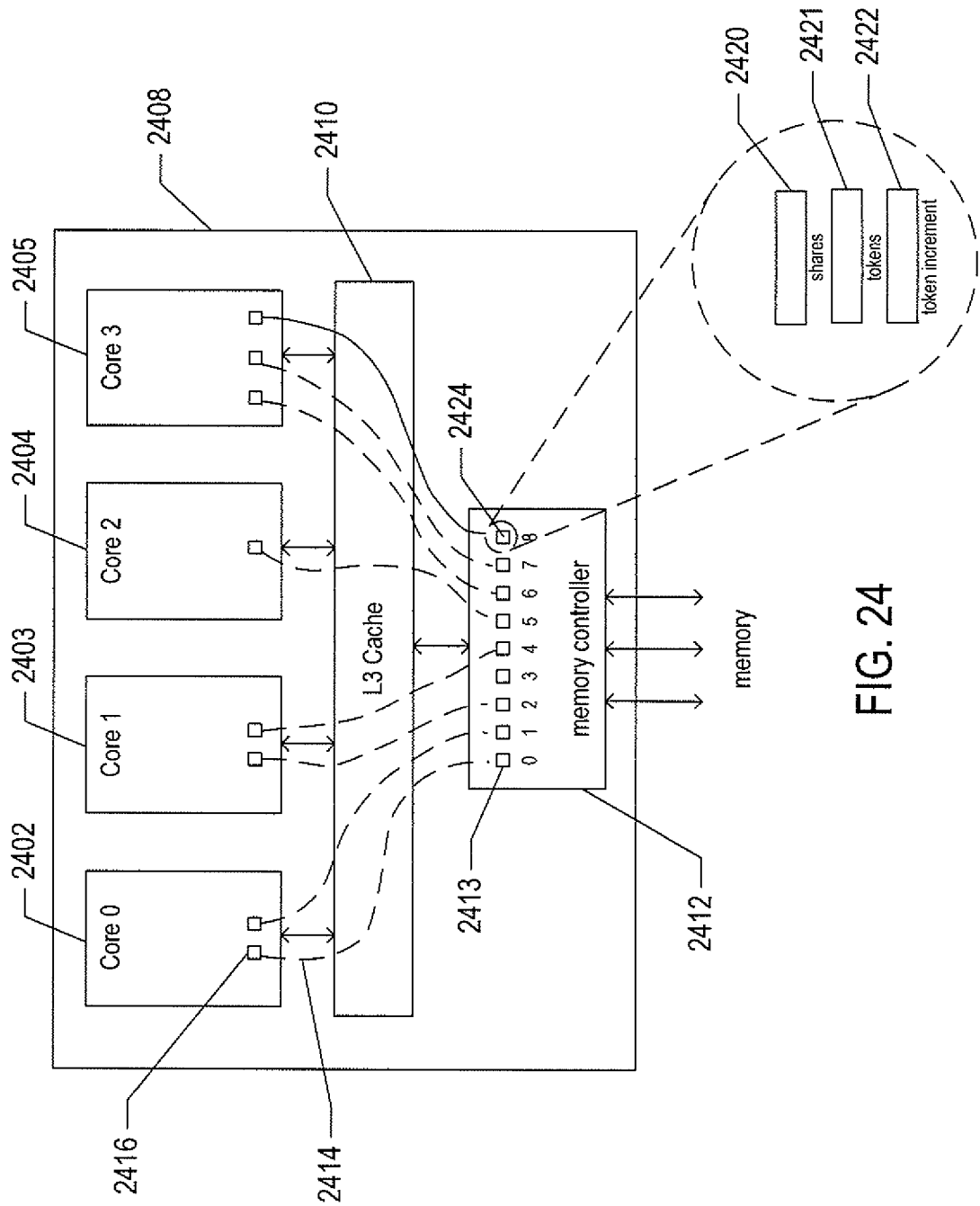
FIG. 24 illustrates an approach taken in order to provide controllable memory-access-resource multiplexing among virtual machines at the hardware level that is used in certain methods and systems disclosed in the current application.

FIG. 24 illustrates an approach taken in order to provide controllable memory-access-resource multiplexing among virtual machines at the hardware level that is used in certain methods and systems disclosed in the current application. FIG. 24 shows four cores 2402-2405 within a multi-core processor 2408 such as the multi-core processor previously described with reference to FIG. 15. The multi-core processor includes a shared L3 cache 2410 interconnected via a memory controller 2412 to local memory. According to the current application, the memory controller is provided, at the physical-hardware level, with buckets or channels, such as channel 2413, representing portions of the overall memory-access resource represented by the memory controller and other memory-access-related components of the multi-core processor. These channels are then mapped, as shown in FIG. 24 by dashed curves, such as dashed curve 2414, to virtual machines, such as virtual machine 2416, executing within the cores 2402-2405. In fact, the mapping can be made to other types of computational entities, including processes and/or software threads executing within multi-processor execution environments provided by operating-systems. In one implementation, each channel or bucket is described, within the memory controller, by three registers. In FIG. 24, the three registers 2420-2422 that describe channel 8 (2424 in FIG. 24) are shown. A first register 2420 stores a share allocation for the channel, analogous to shares of a resource within a resource pool allocated to virtual machines, as discussed above with reference to FIG. 20. A second register 2421 stores a number of tokens currently held by the channel, and a third register 2422 stores an indication of the number of tokens to be supplied to the channel at periodic intervals by the memory controller. The contents of these registers may be modified by modifying the contents of system registers within the multi-core processor, in certain implementations. In alternative implementations, the multi-core processor provides a programming interface to allow the contents of the shares, tokens, and token-increment registers associated with each of the channels to be specified by computational entities having access to the programming interface. Additionally, a system register or programming interface may be provided to allow multi-channel operation of the memory controller to be invoked and discontinued by a computational entity, such as a virtualized-computer-system manager or an operating system. Multi-channel operation of the memory controller and multi-core processor is described below, with reference to FIGS. 26-27F. As noted above, multi-core processors with a large number of cores may include multiple multi-channel memory controllers. The multiple multi-channel memory controllers may intercooperate to together provide a set of channels across the multiple multi-channel memory controllers to multiplex memory-controller capacity among all VMs executing within a multi-core processor, essentially rendering the separate multiple multi-channel memory controllers as a higher-level, higher-capacity multi-component multi-channel memory controller. Alternatively, cores may be grouped together for memory access, each group of cores sharing a single memory controller, with the entire memory-controller resource partitioned into separate memory controllers that each provides channel-based multiplexing among the cores within a particular group of cores.

Figure 25:
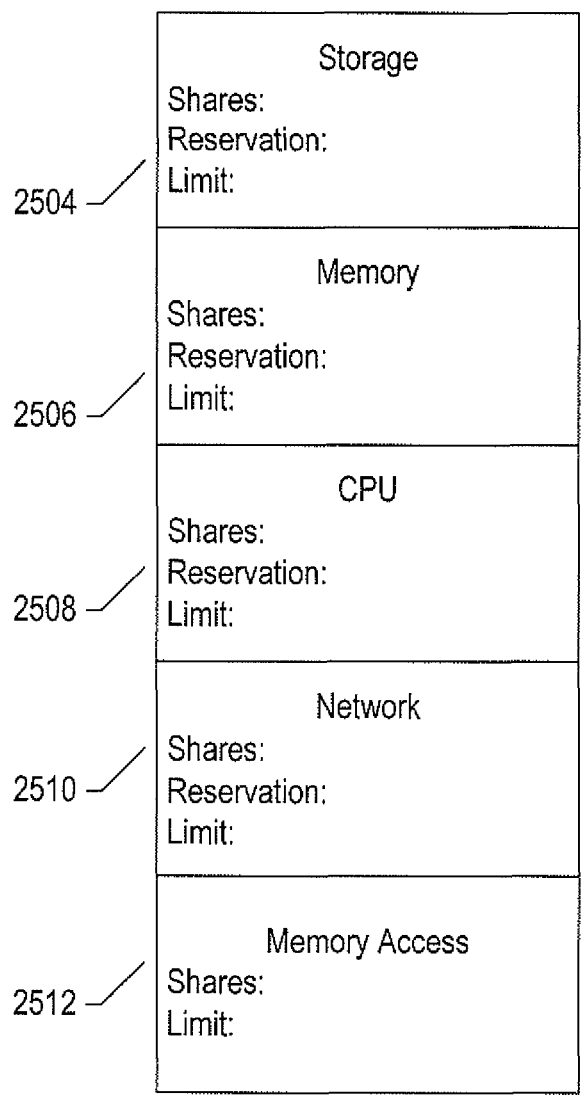
FIG. 25 shows resource-pool-related allocations for a virtual machine within a virtualized computer system similar to the resource-pool allocations encoded in the data-storage 2200 shown in FIG. 22.

By providing a memory controller within a multi-core processor that provides for multi-channel operation, the memory-access resource represented by the memory controller, L3 caches, and other components of the multi-core processor can be shared among virtual machines within a virtualized computer system as another type of resource component of a resource pool. FIG. 25 shows resource-pool-related allocations for a virtual machine within a virtualized computer system similar to the resource-pool allocations encoded in the data-storage 2200 shown in FIG. 22. The resource-pool allocations include resource-allocations related to data storage 2504, memory capacity 2506, CPU bandwidth 2508, networking bandwidth 2510, and memory access 2512. In the implementation shown in FIG. 25, the memory-access resource-pool component of the resource pool provides for allocation of shares and specification of a memory-access-resource limit, as shown in FIG. 25. In this implementation, a memory-access-resource reservation is considered unnecessary, since it is unlikely that a virtual machine would fail to be launched based on a memory-access-resource reservation. However, in those cases in which memory-access-resource reservation is desired, reservation can be added and enforced by a virtualized-computer-system manager.

Figure 26:
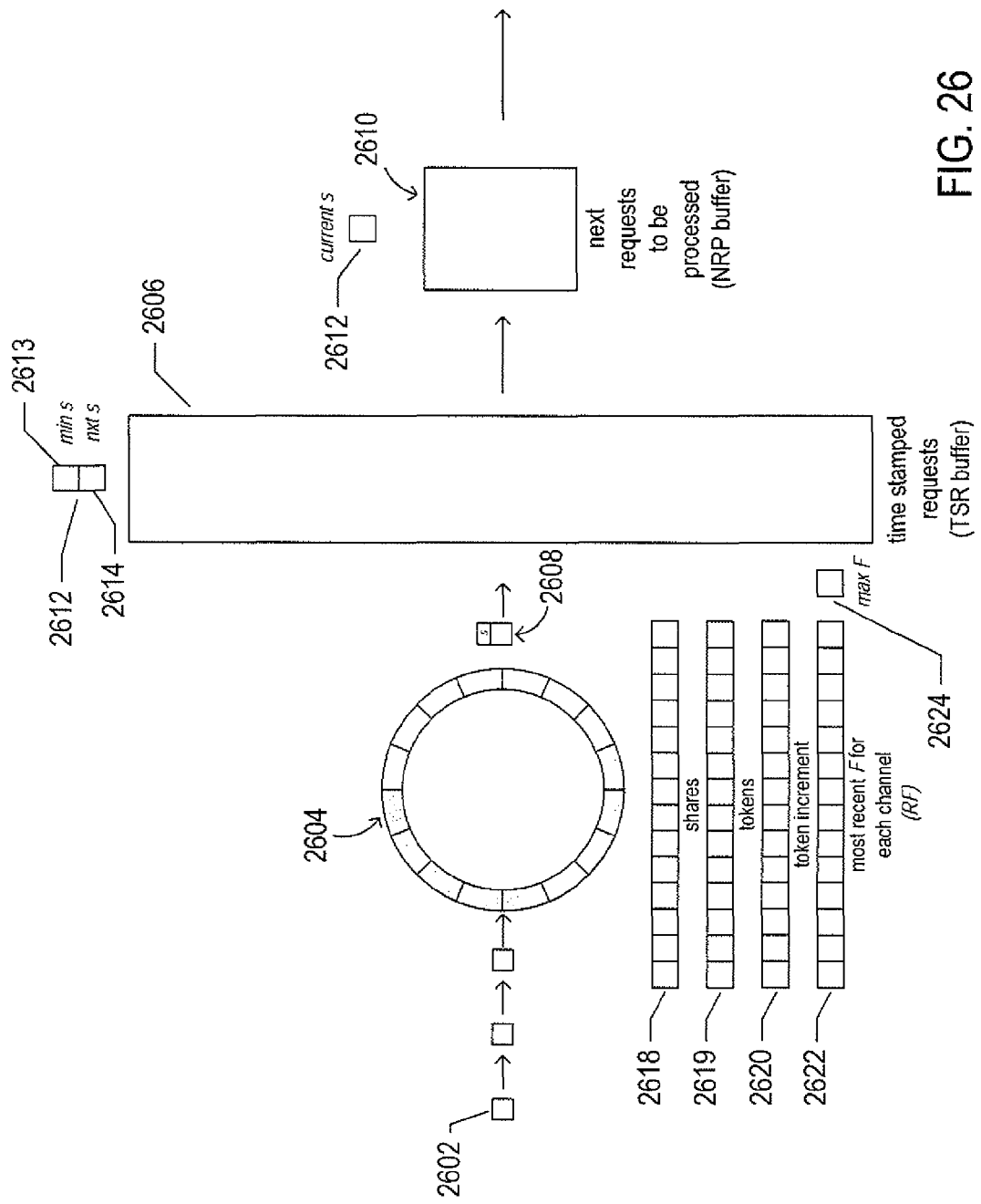
FIG. 26 illustrates the information structures within, and a general control flow for, a multi-channel memory controller that provides for memory-access-resource multiplexing in a virtualized computer system as part of resource-pool-based resource aggregation and administration.

FIG. 26 illustrates the information structures within, and a general control flow for, a multi-channel memory controller that provides for memory-access-resource multiplexing in a virtualized computer system as part of resource-pool-based resource aggregation and administration. The information structures are implemented as hardware registers and other types of hardware data structures within a memory controller. Alternatively, the memory-access-resource-multiplexing memory controller may be used within a computer system controlled by a multi-processing operating system. Memory requests are shown as small squares, such as square 2602, and are input to the memory controller by computational entities executing within hardware threads and cores. The input requests are initially buffered within a circular input queue 2604. The input queue 2604 provides an initial buffer so that various asynchronous processes within the memory controller need not be interrupted as a result of incoming memory-access requests. An asynchronous process within the memory controller removes memory-access requests from the input queue 2604, time stamps the memory-access requests, and then stores the time-stamped memory-access requests within a time-stamped-requests buffer ("TSR") 2606. In FIG. 26, a memory-access request removed from the input queue and time stamped is shown as rectangle 2608 prior to being written to the TSR buffer. Time-stamped memory-access requests are removed, in time stamp order in time, from the TSR buffer and placed in a next-requests-to-be-processed buffer 2610 ("NRP buffer"). Requests are removed from the NRP buffer for processing by the memory controller. Time stamps control the temporal movement of memory-access requests from the TSR buffer to the NRP buffer, and do not need to be associated with memory-access requests in the NRP buffer. Two registers 2612, including a min 2613 and a nxt s register 2614, are associated with the TSR buffer. These registers store the minimum time stamp of a memory-access request stored in the TSR buffer and the next smallest or lowest-magnitude time stamp stored in the TSR buffer, respectively. A register current s 2616 is associated with the NRP buffer, and stores the time stamp value of all of the memory-access requests in the NRP buffer and, therefore, the time stamp of memory-access requests that are currently being processed by the memory controller. Three register arrays 2618-2620 store the share, token, and token-increment values for each of the channels or buckets provided by the memory controller. The number of channels is an implementation parameter that may vary with different types of memory controllers, with different types of multi-core processors, and with the types of computer systems in which these multi-core processors are incorporated. Register array RF 2622 stores the finish time ("F") computed for the most recently time-stamped memory-access request for each channel, and register max F 2624 stores the maximum finish time, F, currently stored in the register array RF. At power up, many of the registers are cleared, or set to 0, and adding a number to the contents of a register may cause the contents of the register to wrap around from or through a largest-possible stored integer to or through 0. In other words, addition is modulo one plus the largest integer that can be stored in the register.

In general, the share allotment for a channel specifies the frequency, in time, at which memory-access requests are processed by the channel while the tokens and token-increments for channels present a hard limit on the portion of the memory-access resource that can be used by a particular channel. Thus, the shares and token increment provide a physical, hardware basis for resource-pool share-based and limit-based administration.

Figure 27A:
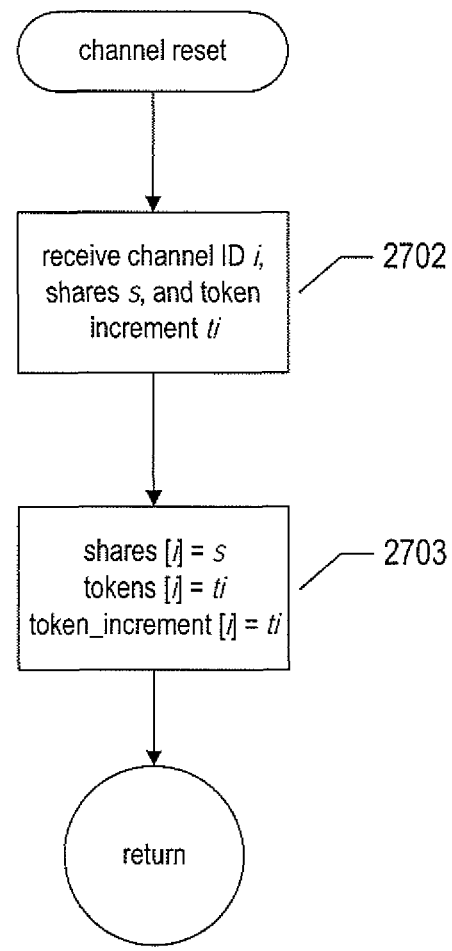
FIG. 27A provides a control-flow diagram for external specification of channel characteristics for a multi-channel memory controller according to the current application.

FIG. 27A provides a control-flow diagram for external specification of channel characteristics for a multi-channel memory controller according to the current application. In step 2702, the memory controller receives an indication of a particular channel, or channel ID i, the number of shares to allocate to the channel s, and a number of tokens to provide to the channel at periodic intervals, or token increment ti. As discussed above, these values may be specified in a system control register or may be supplied through a type of memory-controlling programming interface. Then, in step 2703, the memory controller sets the three registers for the channel to the specified values. Note that C-language-like notation is used to indicate the setting of the shares, tokens, and token-increment registers for channel i.

Figure 27B:
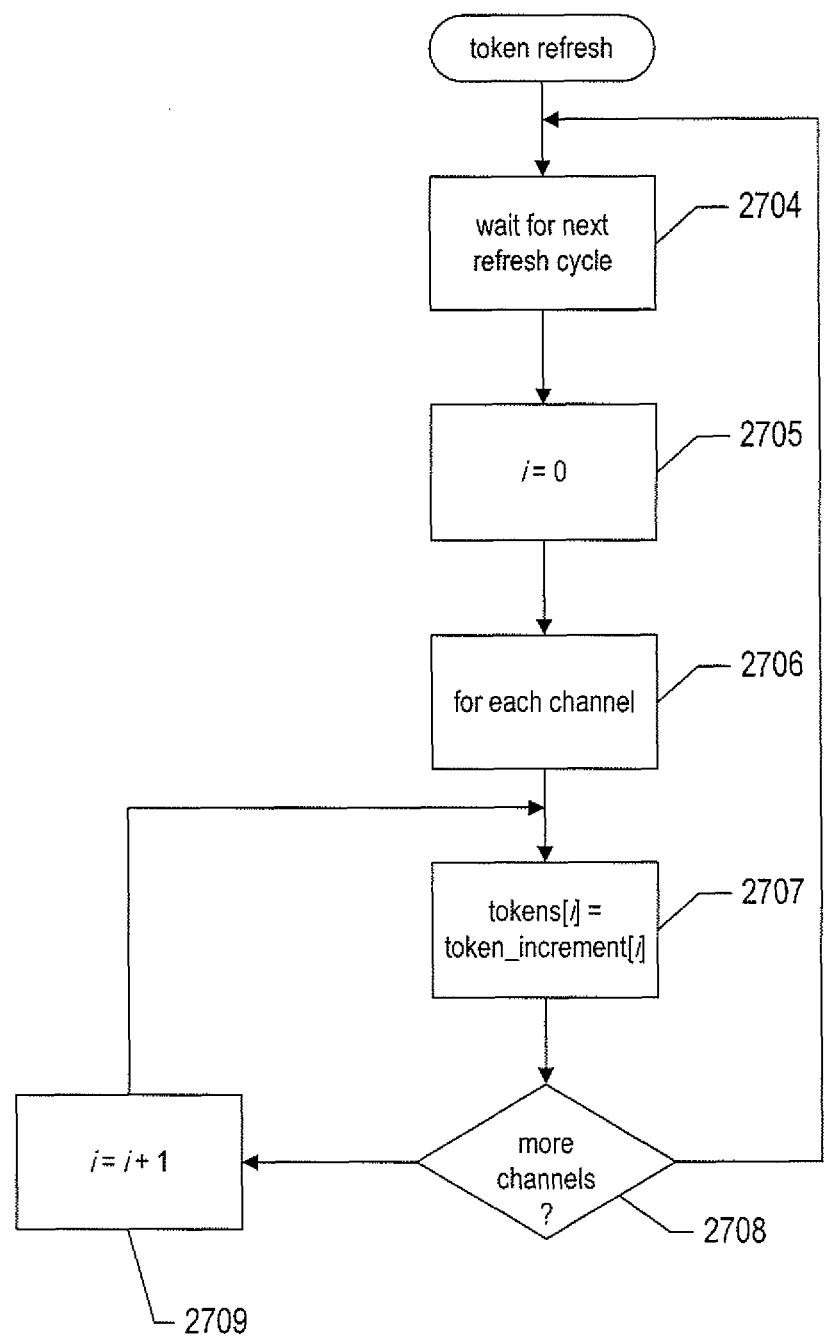
FIG. 27B provides a control-flow diagram for a token-refresh asynchronous process that runs within the memory controller.

FIG. 27B provides a control-flow diagram for a token-refresh asynchronous process that runs within the memory controller. In step 2704, the token-refresh process waits for a next refresh cycle. When the beginning of a next refresh cycle occurs, then, in step 2705, the local variable i is set to 0 and, in the for-loop of steps 2706-2709, the number of tokens for each channel provided by the memory controller is set to the token-increment value for that channel. Thus, at periodic intervals, the memory controller refreshes the number of token allocated to each channel according to the token-increment schedule specified for the channel.

Figure 27C:
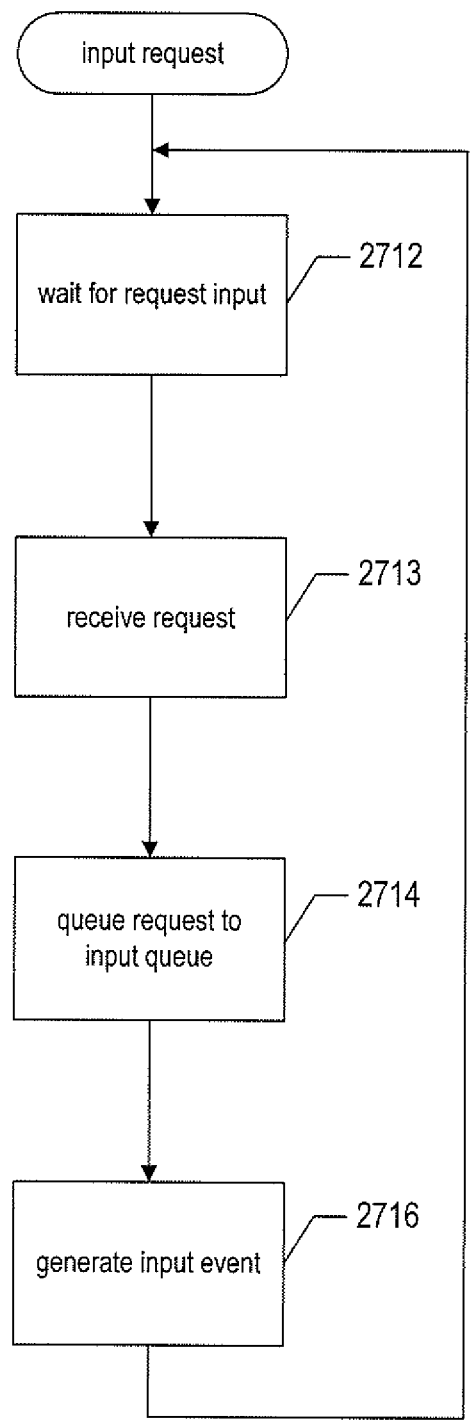
FIG. 27C provides a control-flow diagram for an input-request asynchronous process that operates within the memory controller.

FIG. 27C provides a control-flow diagram for an input-request asynchronous process that operates within the memory controller. In step 2712, the input-request process waits for a request-input event or interrupt indicating that a new memory-access request has been made available to the memory controller via signal paths connecting the memory controller to the remaining components of the multi-core processor. When an input request event occurs, then, in step 2713, the input-request process receives the request and queues the request to the input queue (2604 in FIG. 26) in step 2714. Finally, the input-request asynchronous process generates in internal input event, or interrupt, in step 2716, before again waiting for the next request input. In an alternative implementation, steps 2713, 2714, and 2716 may be repeated within an iterative loop in order to process multiple input memory-access requests that occur during processing of an initially received input memory-access request.

Figure 27D:
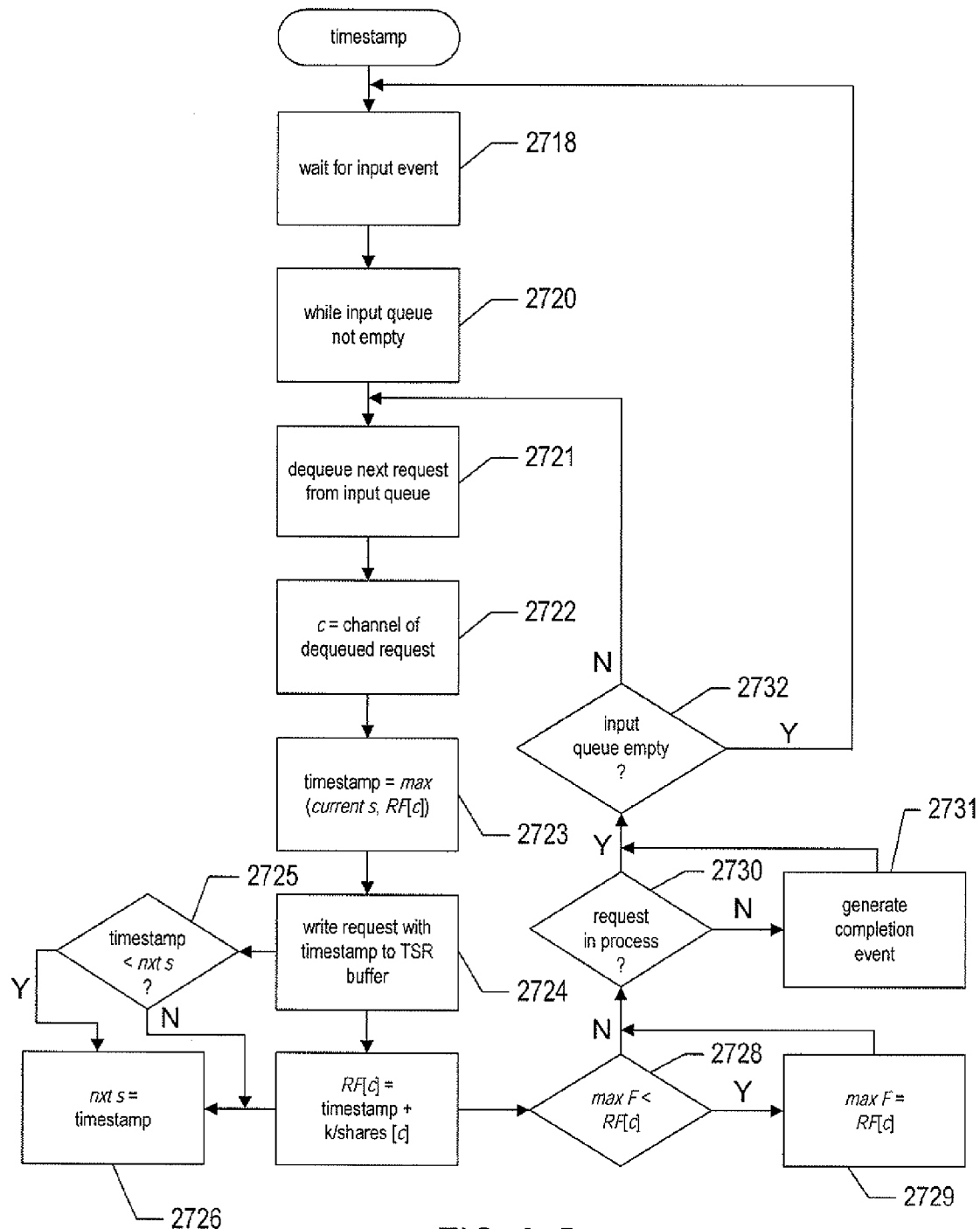
FIG. 27D provides a control-flow diagram for a timestamp asynchronous process that removes a request from the input queue, time stamps the memory-access requests, and mites the time-stamped memory-access request to the TSR buffer.

FIG. 27D provides a control-flow diagram for a timestamp asynchronous process that removes memory-access requests from the input queue, time stamps the memory-access requests, and writes the time-stamped memory-access request to the TSR buffer. In step 2718, the timestamp asynchronous process waits for an input event generated by the input-request asynchronous process in step 2716 of FIG. 27C. Then, in the while-loop of steps 2720-2732, the timestamp asynchronous process processes all of the memory-access requests currently residing within the input queue (2604 in FIG. 26). In step 2721, the timestamp asynchronous process dequeues a next request from the input queue. In step 2722, the local variable c is set to the channel through which the dequeued request was received. Channel indications or IDs may be included in memory-access requests or may be indicated by input signals that accompany input of a memory-access request that are stored along with the memory-access request in the input queue. In step 2723, a timestamp is generated for the dequeued request. The timestamp is the maximum value of either the current contents of the current s register (2616 in FIG. 26) or the finish value, F, for channel c stored in the RF register array. In step 2724, the time-stamped memory-access request is written to the TSR buffer (2606 in FIG. 26). When the value of a timestamp is less than the current value of the register nxt s (2614 in FIG. 26), as determined in step 2725, then the register nxt s is set to the timestamp value in step 2726. The F value for the memory-access request is then computed, in step 2727, as the time stamp value computed in step 2723 plus a constant value k divided by the share allotment for channel c, or, in other words, RF[c] timestamp+(k/shares [c]). The F value is, as indicated by this expression, stored in the RF register-array entry for channel c. When the value currently stored in the register max F (2624 in FIG. 26) is less than the F value calculated in step 2727, as determined in step 2728, then max F is set, in step 2729, to the F value calculated in step 2727. When there is no memory-access request currently being processed by the memory controller, as determined in step 2730, then the timestamp asynchronous routine generates a completion event in step 2731. If there are additional memory-access requests in the input queue, as determined in step 2732, then control flows back to step 2721. Otherwise, control flows to step 2718.

Figure 27E:
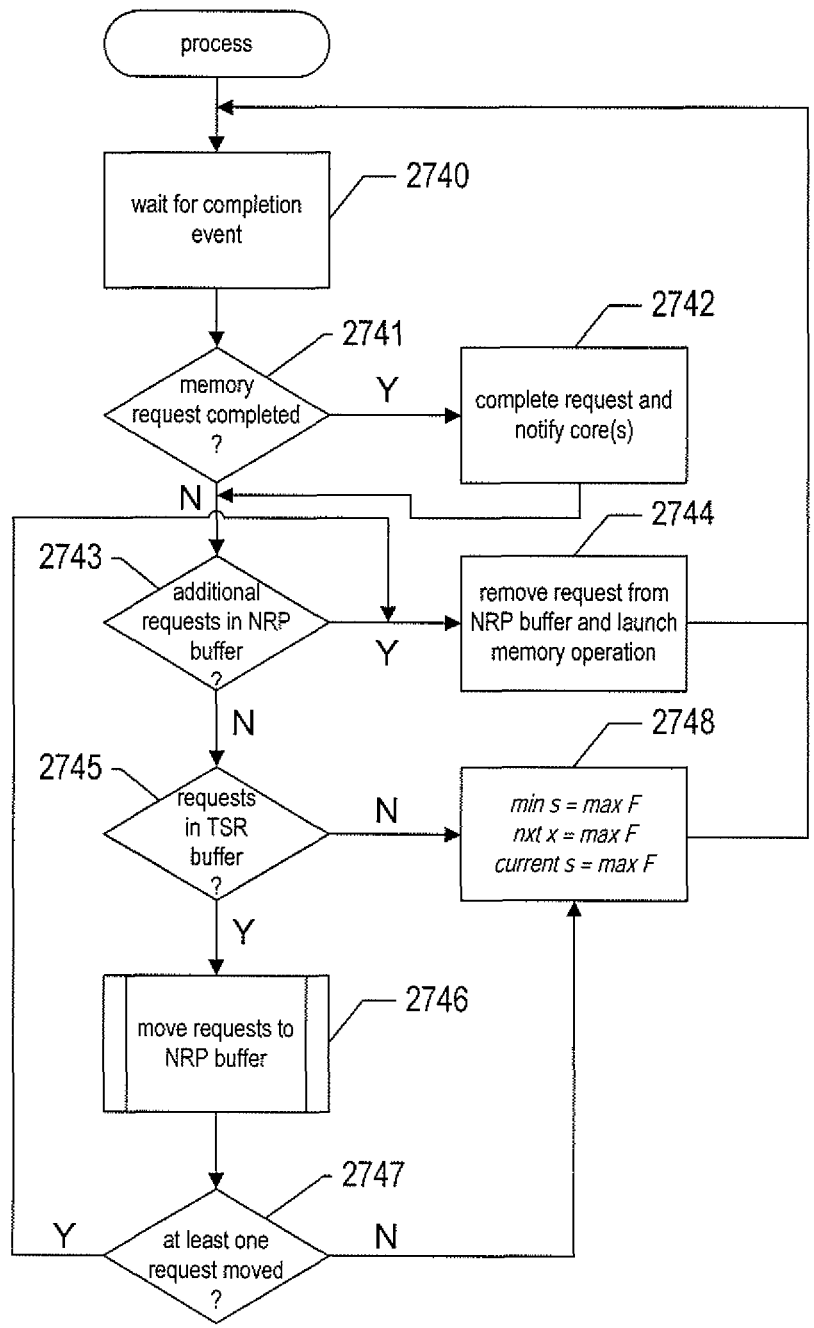
FIGS. 27E-F provide control-flow diagrams for an asynchronous routine that processes memory-access requests by the memory controller.
Figure 27F:
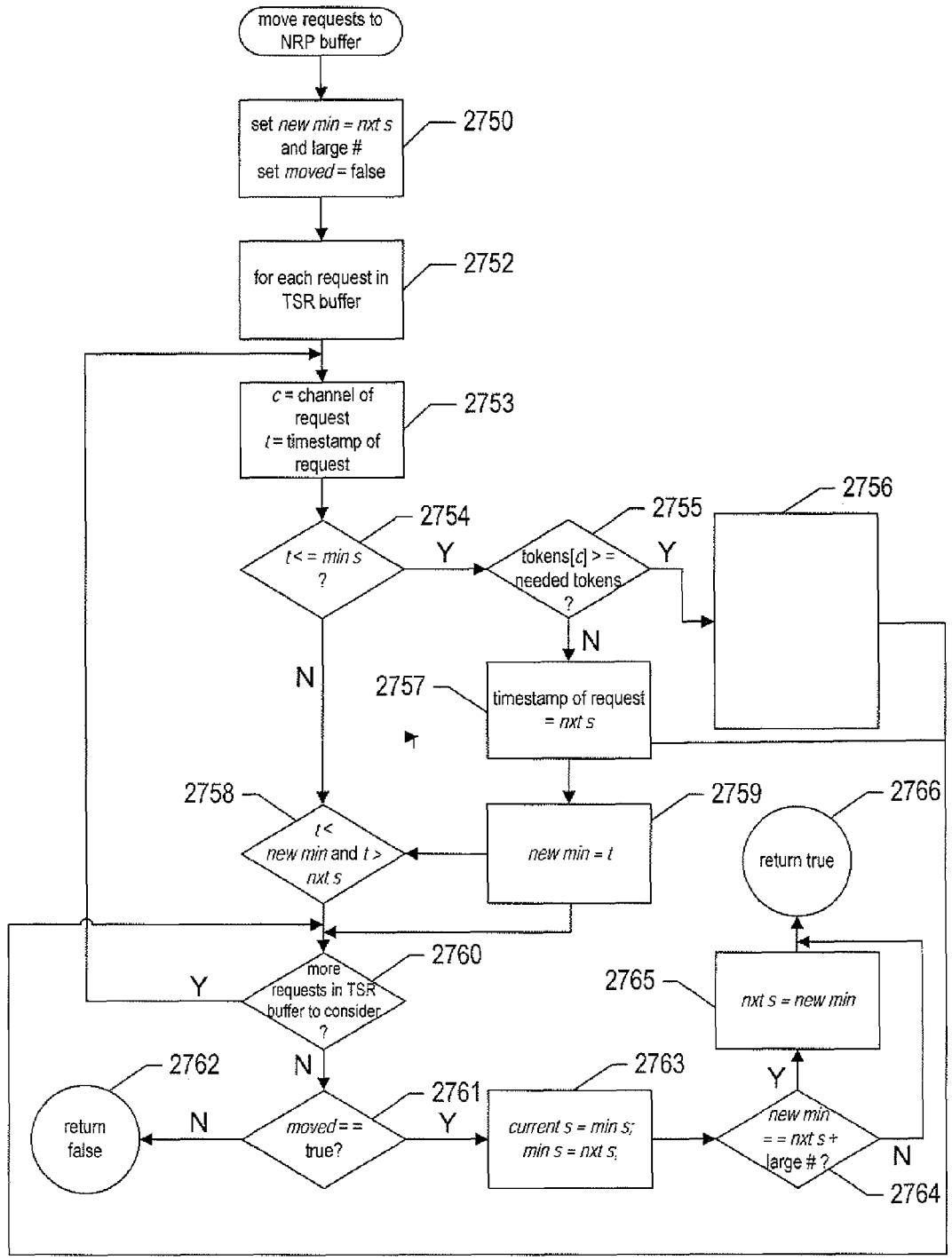

FIGS. 27E-F provide control-flow diagrams for an asynchronous routine that processes memory-access requests by the memory controller. Returning first to FIG. 27E, the process asynchronous routine waits, in step 2740, for a next completion event to occur. In step 2741, the process asynchronous routine determines whether or not the completion event as generated as a result of completion of processing of a memory-access request by the memory controller. When so, then the memory controller carries out any additional tasks needed to return the memory-access request to a memory-access-requesting core in step 2742. In step 2743, the process asynchronous routine determines whether there are additional requests in the NRP buffer for processing. When there are additional requests, the process asynchronous routine removes a next request from the NRP buffer and launches processing of the memory-access request by the memory controller, in step 2744, with control then returning to step 2740. Note that the memory-control hardware generates a completion event when processing of a memory-access request is completed. When there are no additional requests in the NRP buffer, but when there are memory-access requests in the TSR buffer, as determined in step 2745, then the routine "move request to NRP buffer" is called in step 2746 to move the next set of time-stamped memory-access requests with a timestamp value equal to that stored in the min s register (2613 in FIG. 26) to the NRP buffer for processing. Following completion of this routine, when the routine returns an indication that no memory-access request was moved from the TSR buffer to the NRP buffer, as determined in step 2747, then the values of the min s, nxt s, and current s registers are updated to all have the value currently stored in the register max F, and control returns to step 2740. When at least one request has been removed from the TSR buffer and placed in the NRP buffer, as determined in step 2747, then control flows back to step 2744 for continued processing.

FIG. 27F provides a control-flow diagram for the routine "move request to NRP buffer" called in step 2746 of FIG. 27E. In step 2750, a local variable new min is set to the current value of the register nxt s plus some large number and the local variable moved is set to "false." Steps 2752-2765 together comprise a for-loop in which each request currently residing in the TSR buffer is considered. In step 2753, the channel c and timestamp value t of the currently considered memory-access request are determined. When the value t is less than or equal to the current value of the register min s, as determined in step 2754, and when channel c has a sufficient number of tokens remaining for the memory-access request to be carried out, as determined in step 2755, then, in step 2756, the memory-access request is moved from the TSR buffer to the NRP buffer, the number of tokens held by channel c is decremented by the number of tokens needed to service the memory-access request, and the local variable moved is set to "true." However, when there are an insufficient number of tokens associated with channel c, as determined in step 2755, the timestamp of the request is updated to the value stored in the register nxt s in step 2757. When the value of the timestamp of the currently considered request is greater than the value stored in the register min s, as determined in step 2754, but when the timestamp value is less than the value currently stored in the local variable new min and is greater than the value stored in the register nxt s, as determined in step 2758, then local variable new min is set to the timestamp value in step 2759. In step 2760, the routine determines whether or not there are more requests in the TSR buffer to consider. When there are, control flows back to step 2753 to consider the next request to be considered in the TSR buffer. Otherwise, in step 2761, the routine determines whether or not the local variable moved is set to the value true. When the local variable moved is not set to the value "true," a "false" value is returned in step 2762. Otherwise, the register current s is set to the current contents of the register min s and the current contents of the register min s is set to the current contents of the register nxt s in step 2763. When the local variable new min has been changed after completion of step 2750, as determined in step 2764, then the value stored in the register nxt s is set to new min in step 2765. Finally, the value "true" is returned in step 2766.

As discussed above with reference to FIG. 26, a memory controller timestamps incoming memory-access requests and then processes the requests in timestamp order. Selection of memory-access requests having the same timestamp value may be carried out randomly or according to any of various different arbitrary selection methods and criteria. The number of shares allotted to a channel influence the frequency with which memory-access requests are processed for the channel via setting of the F value for the channel in step 2727 in FIG. 27D. The token-increment assigned to a channel determines the maximum rate of memory-request processing carried out by the memory controller on behalf of the channel, as seen in step 2755 in FIG. 27F. Thus, the multi-channel memory controller provides a physical-hardware basis for treating the memory-access resource as an additional type of computing resource that can be managed within a resource pool by a management layer or virtualized-computer-system manager.

The above-described timestamp-based multiplexing memory controller can be alternatively implemented. For example. a simpler implementation is to associate, within the memory controller, a memory-access-request queue with each channel, and service the memory-access-request queues in round-robin fashion, with the number of requests serviced or amount of memory accessed during a single servicing of a memory-access-request queue proportional to the fraction of total shares allocated to the channel corresponding to the memory-access-request queue. Additional implementations are possible, including periodic allocations of shares to channels and random servicing of memory requests with corresponding deductions in shares until no further memory requests are serviceable, at which point a next allocation of shares is made.

Multiplexing of memory bandwidth provides for controlled and specifiable fair sharing of the memory-bandwidth resource among multiple computational entities competing for the memory-bandwidth resource. Moreover, a multiplexing controller can be used to provide a specified quality of service to each concurrently and/or simultaneously executing computational entity within a multi-core processor or other hardware device that supports simultaneous execution of multiple threads or processes that access memory through one or more shared memory controllers and other hardware components related to memory access.

Although the present invention has been described in terms of particular embodiments, it is not intended that the invention be limited to these embodiments. Modifications within the spirit of the invention will be apparent to those skilled in the art. For example, any of a variety of different implementation and design parameters, including control structures, modular organization, data structures, type of logic circuitry, type of firmware, and other such parameters may be varied in order to generate a variety of different implementations of a multi-channel memory controller and a management layer or virtualized-computer-system manager that employs a multi-channel controller to allocate memory-access resources, as part of a resource pool, to virtual machines. While several separate buffers are shown, in FIG. 26, within the memory controller, certain implementations may use only a single input queue within which memory-access requests are time stamped and from which memory-access requests are selected for processing. A multiple-buffer implementation is shown, in FIG. 26, for convenience in explaining the memory-access-resource multiplexing carried out by the memory controller, in addition to representing one type of implementation. Multi-channel memory controllers can be included in any of various different types of multi-core processors as well as in other types of computer systems in which a single memory controller is shared by multiple computational entities that execute simultaneously or concurrently. Generation of a multi-channel capacity can be extended, in similar fashion, to other types of physical hardware devices in which simultaneously and/or concurrently executing virtual machines or other computational entities contend.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A multiplexing memory controller comprising:
    a number of channels that each stores a specification of memory-access-request servicing characteristics for the channel;
    a memory-request input through which the multiplexing memory controller receives memory-access requests from two or more processing entities, each memory-access request accompanied with a channel indication; and
    memory-controller logic that processes the received memory-access requests in order to provide memory-access-request servicing to each channel in accordance with the channel's memory-access-request servicing characteristics;
    wherein each channel is associated with a number of registers that store values that specify the memory-access-request servicing characteristics for the channel, including a memory-access-request processing priority and a memory-access-request processing limit; and wherein each channel is associated with three-registers, including
- a shares register that stores a number of memory-access-resource shares,
- tokens register that stores a current number of memory-access-request-processing tokens, and
- a token-increment register that stores an indication of a number of memory-access-request-processing tokens to be allocated to the channel by the multiplexing memory controller during each token-refresh cycle.

2. The multiplexing memory controller of claim 1 wherein each memory-access request input to the multiplexing memory controller is time-stamped by the memory controller.

3. The multiplexing memory controller of claim 2 wherein the timestamp assigned to a next memory-access request received by the memory controller with respect to a particular channel is one of:
- a value equal to a timestamp value assigned to a memory-access request currently being processed by the memory-controller logic; and
- a finish value computed for the last memory-access request with respect to the particular channel that was time-stamped by the memory controller.

4. The multiplexing memory controller of claim 3 wherein the finish value for a memory-access request received through a particular channel is computed as the timestamp assigned to the memory-access received through a particular channel is computed as the timestamp assigned to the memory-access request to which a value inversely proportional to the value stored in the shares register associated with the channel is added.

5. The multiplexing memory controller of claim 2 wherein time-stamped memory-access requests are processed by the multiplexing memory controller in timestamp order.

6. The multiplexing memory controller of claim 2 wherein a memory-access request is processed only when the number of tokens stored in the tokens register associated with the channel associated with the memory-access request is greater or equal than a number of tokens needed to process the memory-access request.

7. The multiplexing memory controller of claim 1 wherein processing entities include one or more of:
- hardware threads;
- cores; and
- processors.

8. A virtualized-computer system comprising:
- a number of computers, each containing two or more processing entities;
- a number of networking subsystems, each providing transmission of data to, and reception of data from, one or more remote computers;
- a number of memories;
- a number of data-storage devices;
- one or more multiplexing memory controllers; and
- a virtualized-computer-system manager that aggregates the number of computers, the number of networking subsystems, the number of memories, the number of data-storage devices, and the one or more multiplexing memory controllers into a root-node resource pool, and allocates shares of each type of resource in the root-node resource pool or in ancestor-node resource pools hierarchically derived from the root-node resource pool to virtual machines, execution of which is managed by the virtualized-computer-system manager;

wherein the one or more multiplexing memory controllers each provides a number of channels, and wherein the virtualized-computer-system manager assigns channels to virtual machines; and wherein the one or more multiplexing memory controllers each comprises the number of channels that each stores a specification of memory-access-request servicing characteristics for the channel,
a memory-request input through which the multiplexing memory controller receives memory-access requests from two or more processing entities, each memory-access requests accompanied with a channel indication, and
memory-controller logic that processes the received memory-access requests in order to provide memory-access-request servicing to each channel in accordance with the channel's memory-access-request servicing characteristics;

wherein each channel is associated with a number of registers that store values that specify the memory-access-request servicing characteristics for the channel, including a memory-access-request processing priority and a memory-access-request processing limit; and wherein each channel is associated with three-registers, including
- a shares register that stores a number of memory-access-resource shares;
- a tokens register that stores a current number of memory-access-request-processing tokens; and
- a token-increment register that stores an indication of a number of memory-access-request-processing tokens to be allocated to the channel by multiplexing memory controller the during each token-refresh cycle.

9. The virtualized-computer system of claim 8 wherein each memory-access request input to the multiplexing memory controller is time-stamped by the memory controller.

10. The virtualized-computer system of claim 9 wherein the timestamp assigned to a next memory-access request received by the memory controller with respect to a particular channel is one of:
- a value equal to a timestamp value assigned to a memory-access request currently being processed by the memory-controller logic; and
- a finish value computed for the last memory-access request with respect to the particular channel that was time-stamped by the memory controller.

11. The virtualized-computer system of claim 10 wherein the finish value for a memory-access request received through a particular channel is computed as the timestamp assigned to the memory-access received through a particular channel is computed as the timestamp assigned to the memory-access request to which a value inversely proportional to the value stored in the shares register associated with the channel is added.

12. The virtualized-computer system of claim 8 wherein time-stamped memory-access requests are processed by the multiplexing memory controller in timestamp order.

13. The virtualized-computer system of claim 8 wherein a memory-access request is processed only when the number of tokens stored in the tokens register associated with the channel associated with the memory-access request is greater or equal than a number of tokens needed to process the memory-access request.

14. The virtualized-computer system of claim 8 wherein processing entities include one or more of:

hardware threads;
cores; and
processors.

\* \* \* \* \*